(12) United States Patent
Davis et al.

(10) Patent No.: US 11,069,951 B2
(45) Date of Patent: Jul. 20, 2021

(54) FURLABLE ANTENNA BLADE DEVICES, SYSTEMS, AND METHODS

(71) Applicant: Roccor, LLC, Longmont, CO (US)

(72) Inventors: Bruce Davis, Boulder, CO (US); William Francis, Lyons, CO (US); Thomas Murphey, Fort Collins, CO (US); Kevin Cox, Boulder, CO (US); Kellie Craven, Lyons, CO (US)

(73) Assignee: Roccor, LLC, Longmont, CO (US)

( * ) Notice: Subject to any disclaimer, the term of this patent is extended or adjusted under 35 U.S.C. 154(b) by 427 days.

(21) Appl. No.: 15/902,521

(22) Filed: Feb. 22, 2018

(65) Prior Publication Data

US 2018/0287240 A1 Oct. 4, 2018

Related U.S. Application Data

(60) Provisional application No. 62/462,177, filed on Feb. 22, 2017.

(51) Int. Cl.
*H01Q 1/08* (2006.01)
*H01Q 1/42* (2006.01)
(Continued)

(52) U.S. Cl.
CPC .............. *H01Q 1/087* (2013.01); *H01Q 1/08* (2013.01); *H01Q 1/088* (2013.01); *H01Q 1/42* (2013.01);
(Continued)

(58) Field of Classification Search
CPC .......... H01Q 1/087; H01Q 1/088; H01Q 1/08; H01Q 1/42; H01Q 17/00; H01Q 21/26; B64G 1/66; B64G 1/1007; B64G 1/222
See application file for complete search history.

(56) References Cited

U.S. PATENT DOCUMENTS 5,313,221 A * 5/1994 Denton, Jr. .............. H01Q 1/48
343/846
6,028,570 A * 2/2000 Gilger .................... H01Q 1/288
343/880
(Continued)

FOREIGN PATENT DOCUMENTS

WO WO2016174625 * 11/2016

OTHER PUBLICATIONS

Cox, Kevin, et al.,"Flight Build of a Furled High Strain Composite Antenna for CubeSats," AIAA Spacecraft Structures Conference 2018, AIAA SciTech Forum 2018, Jan. 8-12, 2018, pp. 407-419.
(Continued)

*Primary Examiner* — Graham P Smith
*Assistant Examiner* — Jae K Kim
(74) *Attorney, Agent, or Firm* — Wilson Patent Law, LLC

(57) ABSTRACT

Methods, systems, and devices for furlable antenna blade components are provided in accordance with various embodiments. For example, some embodiments include a device that may include one or more furlable antenna blade components; each of the one or more furlable antenna blade components may include one or more conductive elements. In some embodiments, each of the one or more furlable antenna blade components include one or more laminate layers. Some embodiments include a method that may include: furling one or more furlable antenna blade components around a central axis; and/or securing the one or more furlable antennae blade components when in a furled state.

25 Claims, 27 Drawing Sheets

(51) Int. Cl.
*B64G 1/22* (2006.01)
*B64G 1/10* (2006.01)
*H01Q 21/26* (2006.01)
*H01Q 17/00* (2006.01)

(52) U.S. Cl.
CPC ............ *B64G 1/1007* (2013.01); *B64G 1/222* (2013.01); *H01Q 17/00* (2013.01); *H01Q 21/26* (2013.01)

(56) References Cited

U.S. PATENT DOCUMENTS

| | | | | |
|---|---|---|---|---|
| 7,278,612 | B1* | 10/2007 | Munder | B64G 1/222 244/172.6 |
| 9,608,333 | B1* | 3/2017 | Toledo | H01Q 1/14 |
| 10,367,246 | B2* | 7/2019 | Rudys | H01Q 1/288 |
| 2015/0288060 | A1* | 10/2015 | Corliss | H01Q 9/38 343/848 |
| 2016/0130066 | A1* | 5/2016 | Ranade | B65D 81/3816 220/592.25 |

OTHER PUBLICATIONS

Davis, Bruce, et al.,"Mechanism Design & Flight Build of Furled High Strain Composite Antenna for CubeSats," 44th Aerospace Mechanisms Symposium, NASA Glenn Research Center, May 16-18, 2018.

* cited by examiner

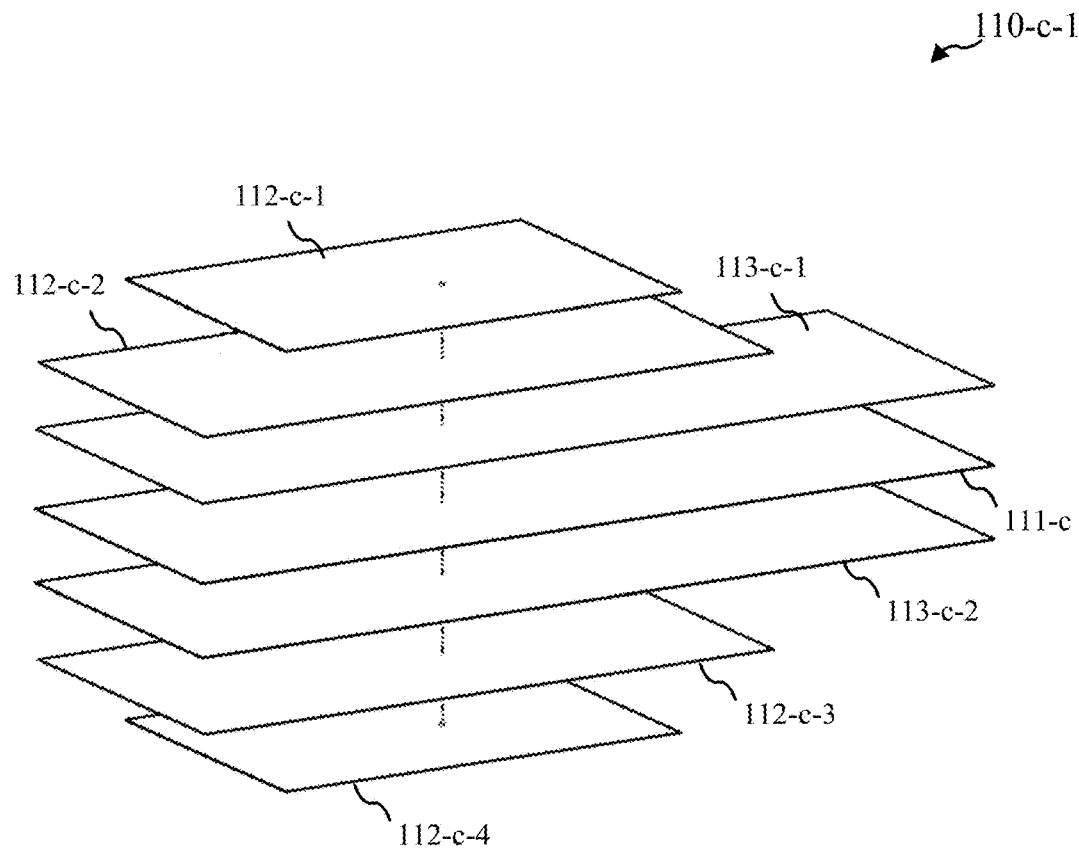
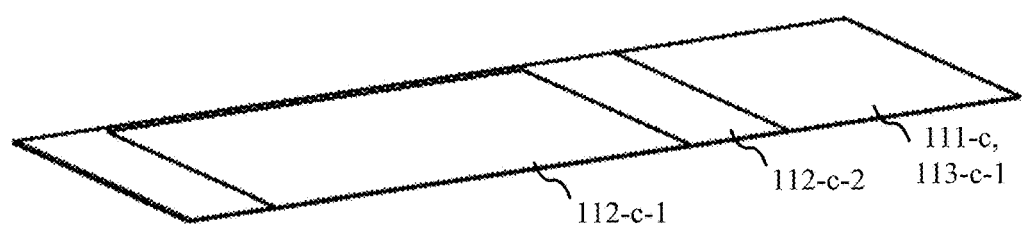
FIG. 2B

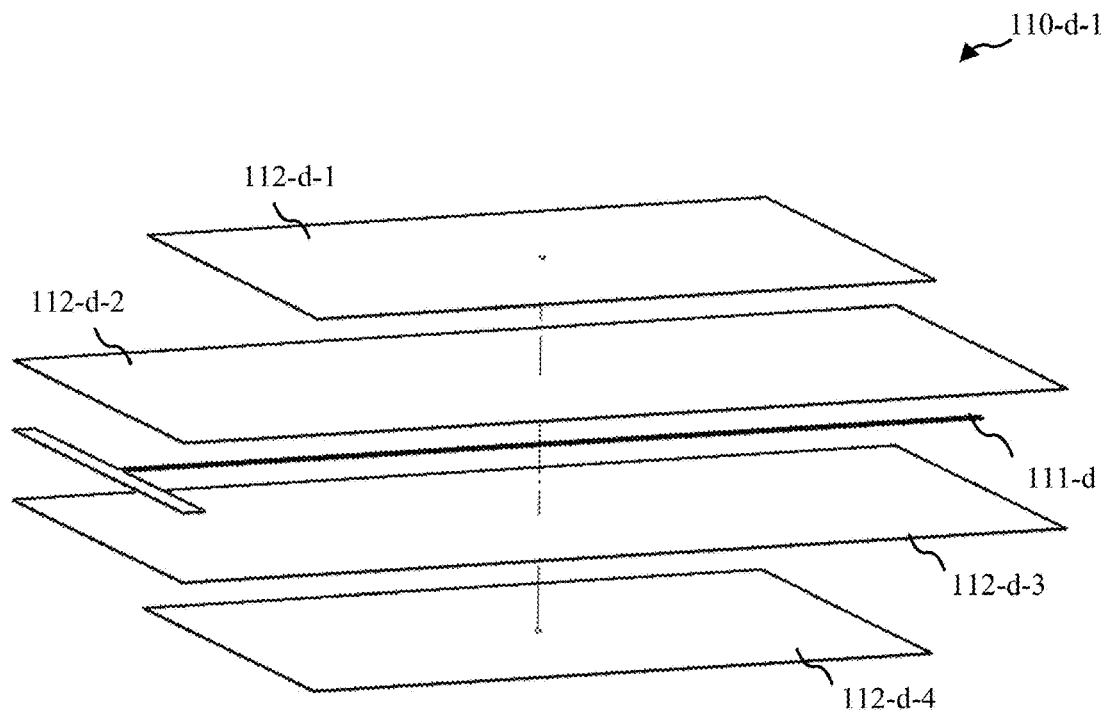
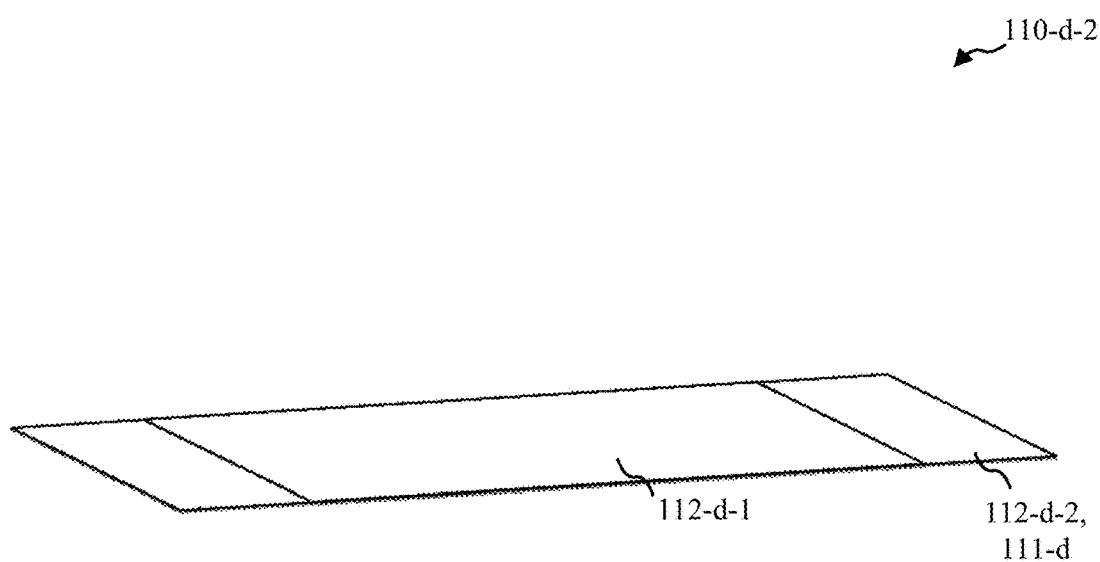
FIG. 2C

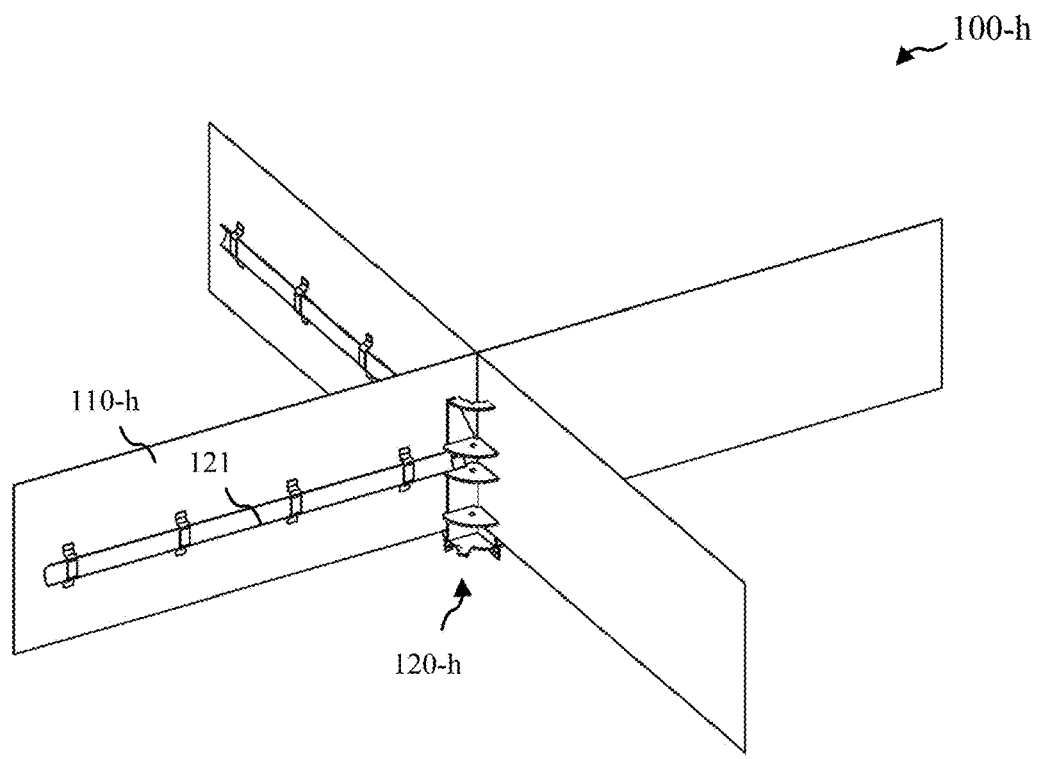
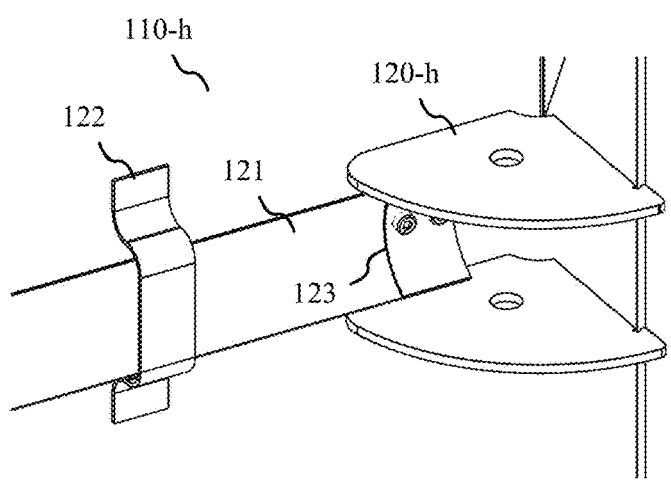
FIG. 3D

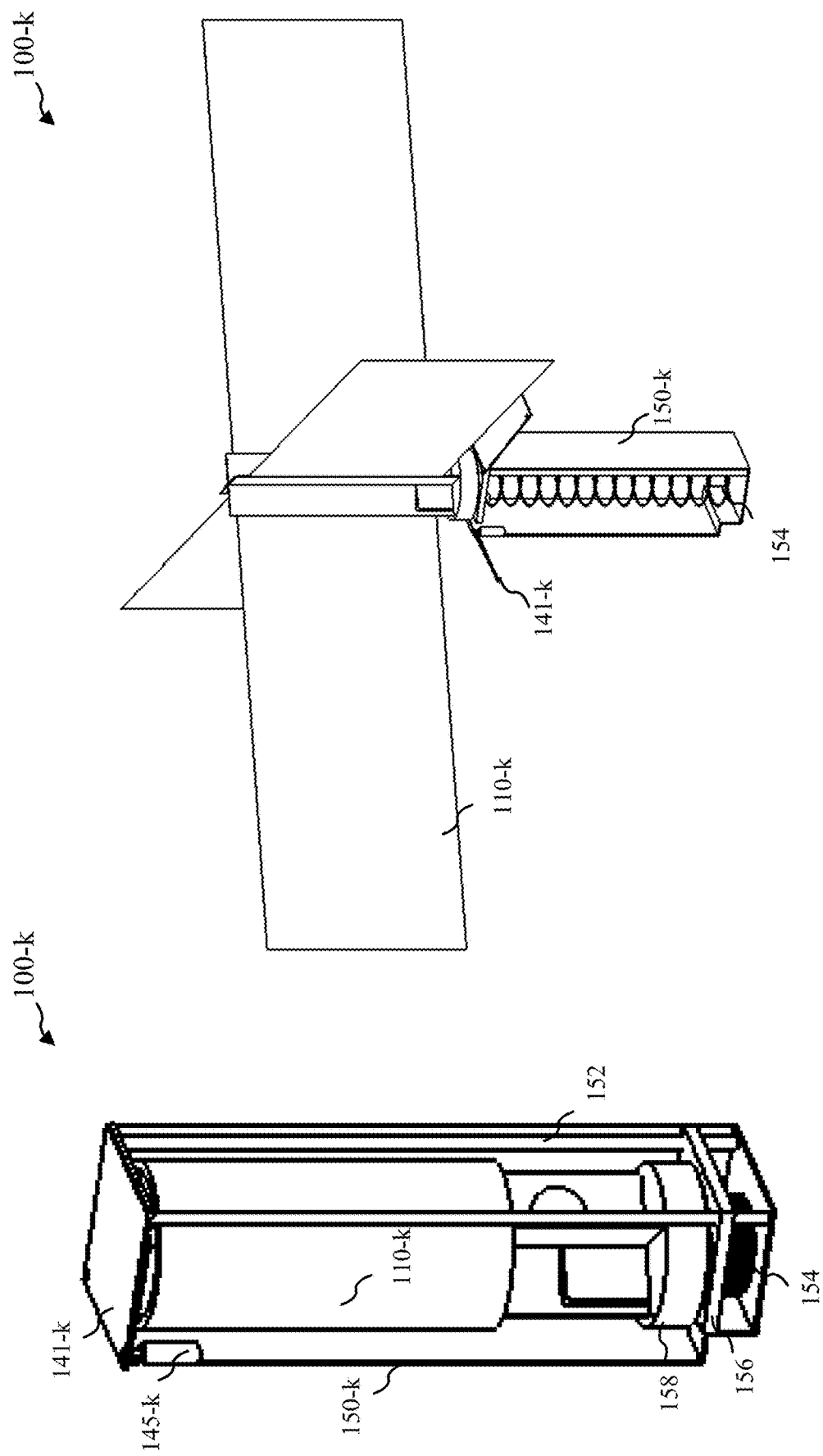

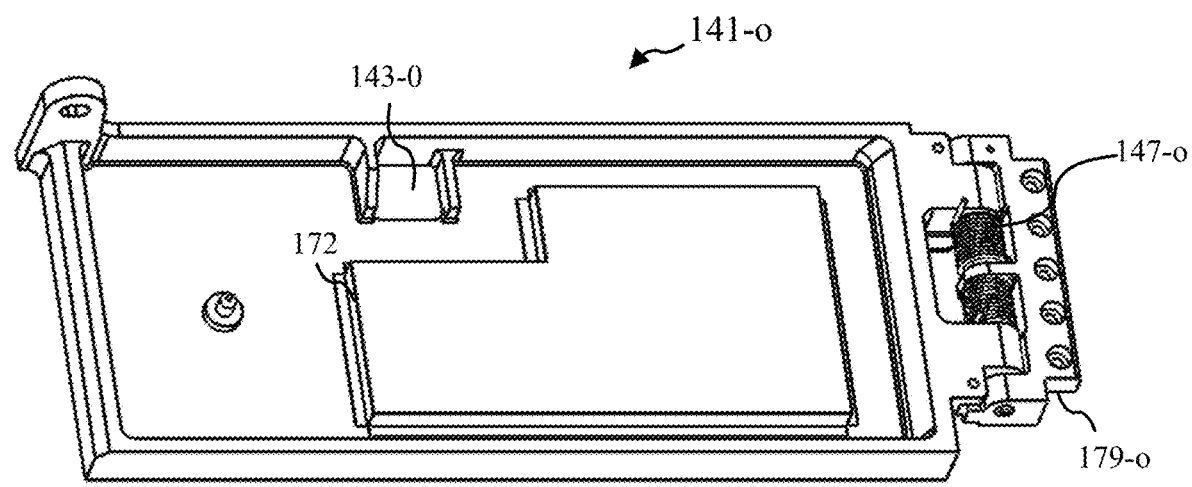
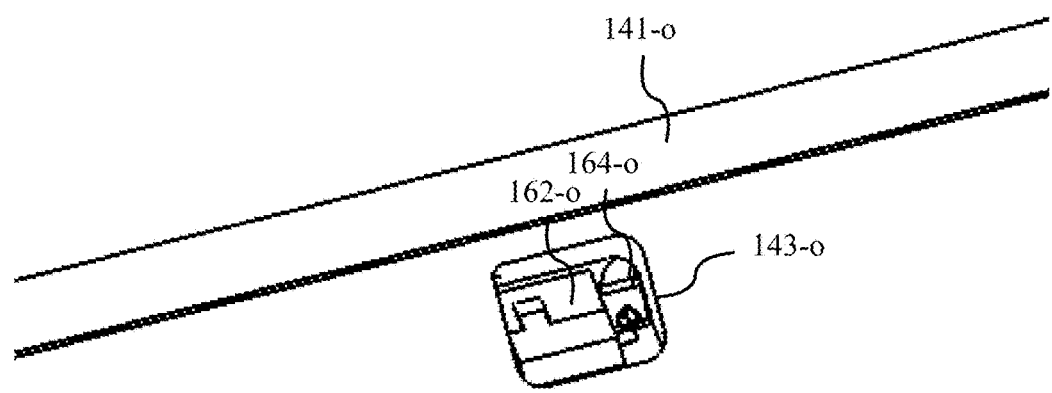
FIG. 9

FURLABLE ANTENNA BLADE DEVICES, SYSTEMS, AND METHODS

CROSS-REFERENCES TO RELATED APPLICATIONS

This application is a non-provisional patent application claiming priority benefit of U.S. provisional patent application Ser. No. 62/462,177, filed on Feb. 22, 2017 and entitled "FURLABLE ANTENNA WING DEVICES, SYSTEMS, AND METHODS," the entire disclosure of which is herein incorporated by reference for all purposes.

BACKGROUND

Different tools and techniques have generally been employed for deployable antenna devices, systems, and methods for space and/or terrestrial applications. However, there may be different issues facing deployable antenna systems, such as how to stow compactly and/or to deploy efficiently the antenna devices.

There may be a need for new tools and techniques to address deployable antenna devices, systems, and methods.

SUMMARY

Furlable antenna blade devices, systems, and methods are provided in accordance with various embodiments. For example, some embodiments include a system that may include one or more furlable antenna blade components; each of the one or more furlable antenna blade components may include one or more conductive elements. In some of the embodiments, the one or more furlable antenna blade components includes one or more laminate layers coupled with the one or more conductive elements.

Some embodiments of the system include one or more antenna support components configured to control a degree of bend of the one or more furlable antenna blade components when furled. Some embodiments include a restraint band component configured to hold the one or more furlable antenna blade components when furled. Some embodiments include one or more restraint band release components. In some embodiments, the one or more restraint band release components include a release pin component configured to release the restraint band component. Some embodiments include at least a tether or a rod coupled with the release pin component such that the one or more furlable antenna blade components are unfurled at a specific point during deployment. In some embodiments, at least one of the one or more furlable antenna blade components is configured such that the restraint band component avoids slippage during deployment of the one or more furlable antenna blade components.

Some embodiments of the system include one or more rotational hinges and one or more stops configured for rotational deployment of the one or more furlable antenna blade components from a storage compartment. Some embodiments include one or more torsion springs configured for the rotational deployment of the one or more furlable antenna blade components from a storage compartment. In some embodiments, the one or more stops include at least a crushable energy absorber or an elastic element.

Some embodiments of the system include a linear slide and stop configured for linear deployment of the one or more furlable antenna blade components from a storage compartment. Some embodiments include one or more linear springs configured for the linear deployment of the one or more furlable antenna blade components from the storage compartment.

In some embodiments of system, the one or more furlable antennae blade components include at least two or more furlable antennae blade components. In some embodiments, the one or more furlable antenna blade components are configured with curvature with respect to a central axis of each of the one or more furlable antenna blade components.

Some embodiments include a storage compartment configured to hold the one or more furlable antenna blade components when furled. Some embodiments include a restraint lid coupled with the storage compartment. Some embodiments include one or more pins configured to prevent motion of the one or more furlable antenna blade components when the one or more furlable antenna blade components are furled and stowed in the storage compartment. In some embodiments, the storage compartment includes one or more encapsulated foam layers. In some embodiments, restraint lid includes at least one aperture configured to hold the restraint band release component in place when the one or more furlable antenna blade components are furled and stowed within the storage compartment.

In some embodiments of the system, the one or more conductive elements include one or more conductive layers. In some embodiments, at least a portion of one or more of the conductive layers extends beyond at least a portion of the one or more laminate layers.

Some embodiments of the system include one or more antenna blade support components that include a conical shaped component configured such that the one or more furlable antenna blade components spiral around the conical shaped component when furled. Some embodiments include one or more stabilizers configured to slide relative the one or more conductive elements of the one or more furlable antenna blade components when furled. Some embodiments include one or more cables coupled with the one or more furlable antenna blade components and configured to provide at least a power link, a ground link, or communication link for the one or more furlable antenna blade components and to avoid twisting during deployment of the one or more furlable antenna blade components.

Some embodiments include a method that may include: furling one or more furlable antenna blade components around a central axis; and/or securing the one or more furlable antennae blade components when in a furled state. Some embodiments include stowing the one or more furlable antenna blade components in the furled state within a storage compartment. In some embodiments, stowing the one or more furlable antenna blade components in the furled state within the storage compartment includes compressing the one or more furlable antenna blade components in the furled state.

Some embodiments of the method include releasing a restraint lid to initiate deployment of the one or more furlable antenna blade components in the furled state from the storage compartment. Some embodiments include rotating the one or more furlable antenna blade components in the furled state out from the storage compartment. Some embodiments include linearly sliding the one or more furlable antenna blade components in the furled state out from the storage component.

Some embodiments of the method include releasing the one or more furlable antenna blade components from the furled state into an unfurled state. In some embodiments, releasing the one or more furlable antenna blade components from the furled state into the unfurled state includes pulling a release pin, wherein the release pin is coupled with a restraint band utilized to secure the one or more furlable antenna blade components in the furled state and the release pin is coupled with at least a tether or rod coupled with the storage compartment. Some embodiments include utilizing at least a burn wire or a mechanical initiator to release the one or more furlable antenna blade components from the furled state into the unfurled state.

In some embodiments of the method, furling the one or more furlable antenna blade components includes spiraling the one or more furlable antenna blade components around a conical shaped component through which the central axis passes. In some embodiments, the one or more furlable antenna blade components includes one or more conductive elements and one or more laminate layers. Some embodiments include one or more surface treatments with respect to at least the one or more conductive elements or the one or more laminate layers.

Some embodiments of the method include preventing motion of the one or more furlable antenna blade components in the furled state through utilizing one or more pins that penetrate at least one of the one or more furlable antenna blade components in the furled state or provide a hard stop edge for the one or more furlable antenna blade components in the furled state.

Some embodiments of the method include utilizing one or more features coupled with at least one of the one or more furlable antenna blade components to avoid slippage of the restraint band during deployment of the one or more furlable antenna blade components from the furled state into the unfurled state. Some embodiments include providing at least lateral support or tensioned support for one or more furlable antenna blade components in the unfurled state.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2B shows a device in accordance with various embodiments.
FIG. 2C shows a device in accordance with various embodiments.
FIG. 3D shows a system in accordance with various embodiments.
FIG. 5A shows a system in accordance with various embodiments.
FIG. 5B shows a system in accordance with various embodiments.
FIG. 9 shows a system in accordance with various embodiments.

DETAILED DESCRIPTION

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

These embodiments may not capture the full extent of combination and permutations of materials and process equipment. However, they may demonstrate the range of applicability of the methods, devices, and/or systems. The different embodiments may utilize more or fewer stages than those described.

Furlable antenna blade devices, systems, and methods are provided in accordance with various embodiments. Different tools and techniques are provided for deployable antenna blade devices, systems, and methods for space and/or terrestrial applications. Some embodiments may provide for furlable antenna blade components that may be fabricated to stow compactly and/or to deploy efficiently the antenna blade devices.

Figure 1A:
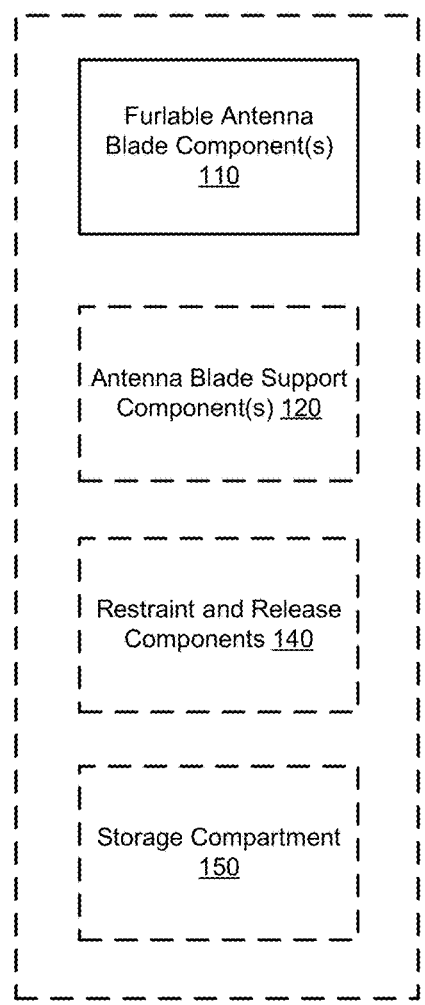
FIG. 1A shows a system in accordance with various embodiments.

FIG. 1A shows an example of a system 100 in accordance with various embodiments. System 100 may include one or more furlable antenna blade components 110. Each of the one or more furlable antenna blade components 110 may include one or more conductive elements. In some of the embodiments, the one or more furlable antenna blade components 110 includes one or more laminate layers coupled with the one or more conductive elements. In some embodiments of system 100, the one or more furlable antennae blade components 110 include at least two or more furlable antennae blade components. In some embodiments, the one or more furlable antenna blade components 110 are configured with curvature with respect to a central axis of each of the one or more furlable antenna blade components 110. In some embodiments of the system 100, the one or more conductive elements of the one or more furlable antenna blade components 110 include one or more conductive layers. In some embodiments, at least a portion of one or more of the conductive layers extends beyond at least a portion of the one or more laminate layers.

Some embodiments of the system 100 include one or more antenna blade support components 120. In some embodiments, the one or more antenna blade support components 120 are configured to control a degree of bend of the one or more furlable antenna blade components 110 when furled. Some embodiments of the system 100 include one or more antenna blade support components 120 that include a conical shaped component configured such that the one or more furlable antenna blade components 110 spiral around the conical shaped component when furled.

Some embodiments may include a variety of restraint and/or release components 140 with respect to the one or more furlable antenna blade components. Some embodiments may include a storage compartment 150. For example, some embodiments include a restraint band component, as part of the restraint and release components 140, configured to hold the one or more furlable antenna blade components 110 when furled. Some embodiments include one or more restraint band release components as part of the restraint and release components 140. In some embodiments, the one or more restraint band release components 140 include a release pin component configured to release the restraint band component. Some embodiments include at least a tether or a rod coupled with the release pin component such that the one or more furlable antenna blade components 110 are unfurled at a specific point during deployment. In some embodiments, at least one of the one or more furlable antenna blade components 110 is configured such that the restraint band component avoids slippage during deployment of the one or more furlable antenna blade components 110.

Some embodiments of the system include one or more rotational hinges and one or more stops configured for rotational deployment of the one or more furlable antenna blade components 110 from the storage compartment 150. Some embodiments include one or more torsion springs configured for the rotational deployment of the one or more furlable antenna blade components 110 from a storage compartment 150. In some embodiments, the one or more stops include at least a crushable energy absorber or an elastic element.

Some embodiments of the system include a linear slide and stop configured for linear deployment of the one or more furlable antenna blade components 110 from a storage compartment 150. Some embodiments include one or more linear springs configured for the linear deployment of the one or more furlable antenna blade components from the storage compartment 150.

Some embodiments include the storage compartment 150 configured to hold the one or more furlable antenna blade components 110 when furled. Some embodiments include a restraint lid coupled with the storage compartment 150. Some embodiments include one or more pins configured to prevent motion of the one or more furlable antenna blade components 110 when the one or more furlable antenna blade components 110 are furled and stowed in the storage compartment 150. In some embodiments, the storage compartment 150 and/or the restraint lid includes one or more encapsulated foam layers. In some embodiments, the restraint lid includes at least one aperture configured to hold the restraint band release component in place when the one or more furlable antenna blade components 110 are furled and stowed within the storage compartment 150.

Some embodiments include one or more stabilizers configured to slide relative the one or more conductive elements of the one or more furlable antenna blade components 110 when furled. Some embodiments include one or more cables coupled with the one or more furlable antenna blade components 110 and configured to provide at least a power link, a ground link, or communication link for the one or more furlable antenna blade components 110 and to avoid twisting during deployment of the one or more furlable antenna blade components 110.

Figure 1B:
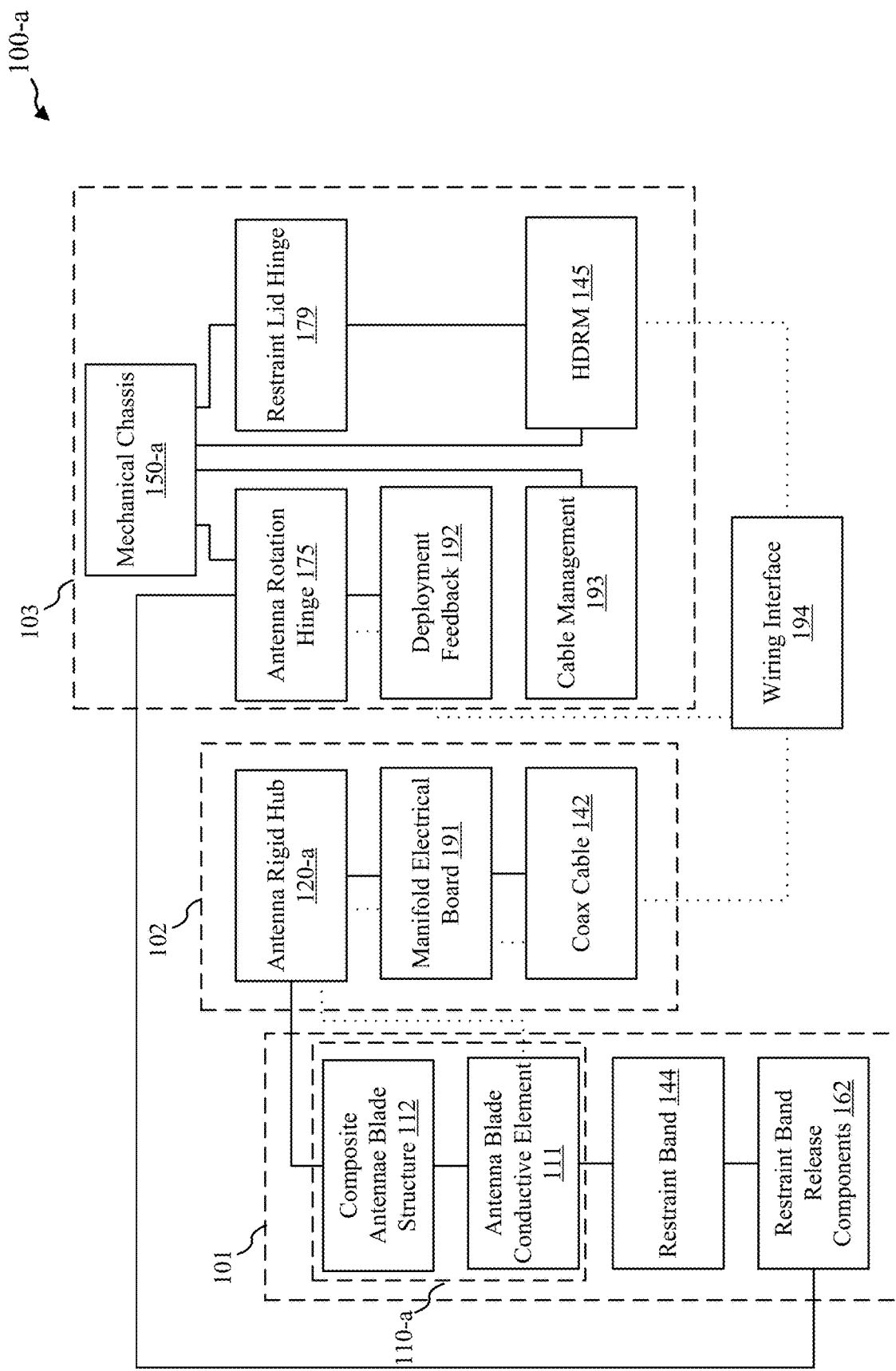
FIG. 1B shows a system in accordance with various embodiments.

FIG. 1B provides a block diagram of system 100-a in accordance with various embodiments. System 100-a may include a blade subassembly 101, a rigid hub subassembly 102, and/or a cassette subassembly 103. System 100-a may be an example of system 100 of FIG. 1A.

The blade subassembly 101 may include a composite blade structure 112 and/or blade conductive element 111; these may be examples of furlable antenna blade components 110-a. The blade subassembly 101 may include a restraint band 144 and/or one or more restraint band release components 162, such as a band clamp and pin; these may be examples of aspects of restraint and/or release components 140.

The rigid hub assembly 102 may include an antenna rigid hub 120-a, a manifold electrical board 191, and/or a coax cable 142. In some embodiments, the antenna rigid hub 120-a may include a conical shaped aspect such that the antenna blade component(s) 110-a may spiral around the conical shaped component when furled.

The cassette subassembly 103 may include a variety of components, such a spacecraft mechanical chassis 150-a. The cassette subassembly 103 may include an antenna rotation hinge 175, deployment feedback 192, cable management 193, restraint lid hinge 179, hold down and release mechanisms (HDRM) 145, and/or spacecraft wiring interface 194.

The variety of components of the blade subassembly 101, the rigid hub subassembly 102, and cassette subassembly 103 may include of different combinations of the noted components in a variety of different configurations in accordance with various embodiments.

Figure 2A:
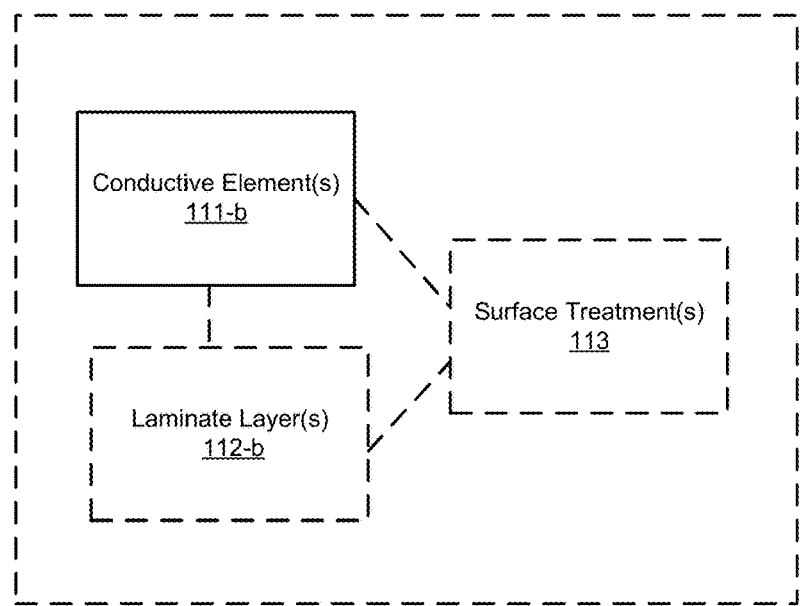
FIG. 2A shows a device in accordance with various embodiments.

Turning now to FIG. 2A, FIG. 2B, and FIG. 2C, examples of furlable antenna blades components 110-b, 110-c, 110-d are provided in accordance with various embodiments. Furlable antenna blade components 110-b, 110-c-1/110-c-2, and 110-d-2/110-d-2 may be examples of furlable antenna blade components 110 of FIG. 1A and/or furlable antenna blade components 110-a of FIG. 1B. For example, FIG. 2A shows furlable antenna blade component 110-b that may include one or more conductive elements 111-b. Furlable antenna blade component 110-b may include one or more laminate layers 112-b in some embodiments. Laminate layers 112-b may be referred to as reinforcement layers in some embodiments. In some embodiments, the one or more conductive elements 111-b may include one or more conductive layers.

Furlable antenna blade component 110-b may be formed into a variety of antenna types. For example, some embodiments include, but are not limited to, dipole antenna blade components, quadrupole antenna blade components, Vivaldi antenna blade components, planar array antenna blade components, and/or slot antenna blade components.

Conductive element 111-b may be formed from a variety of conductive materials. For example, some embodiments include copper, beryllium, brass, steel, stainless steel or other metals. Other conductive materials may be utilized with respect to antenna blade component 110-b.

Some embodiments may utilize one or more laminate or reinforcement layers 112-b. Laminate layers 112-b may be fabricated to include a laminate constructed from one or more layers of laminable material. In some embodiments, the process of creating a laminate may include impregnating or applying an adherent material with respect to one or more layers of laminable material. Sufficient heat or pressure, or both, may be applied to the one or more layers of laminable materials and the adherent material to produce the laminate. For example, in some embodiments, heat may be applied in a range of between about 10 degrees centigrade ("° C.") to about 400° C. and pressure may be applied in a range of between about 15 absolute pounds per square inch ("psi") to about 50,000 psi depending upon the composition, number, thickness, size, porosity, or other factors relating to the one or layers of laminable materials; the source of pressure (whether vacuum pressure, atmospheric pressure, mold pressure, or the like); or the source of heat (whether applied directly through a mold, or indirectly from a remote heat source). Some embodiments may utilize other temperature and/or pressure ranges. Merely by way of example, some embodiments may utilize pressures of less than 15 psi; some embodiments may use pressures below 10 psi or below 5 psi. For example, some embodiments may utilize approximately 1 psi of pressure.

In some embodiments, the one or more layers of laminable material may be used to produce the laminate layers 112-b that may be in the form of discrete or woven fibers including or consisting of, as illustrative examples: boron carbide fibers, silicon carbide fibers, alumina fibers, alumina titanium fibers, carbon fibers, para-aramid fibers such as KEVLAR®, polypropylene such as INNEGRA®, a ultra-high molecular weight polyethylene such as DYNEEMA® or SPECTRA®, s-glass, e-glass, polyester, or the like, or combinations thereof.

In some embodiments, the one or more layers of laminable material may be coated or impregnated with an amount of adherent material having suitable mechanical characteristics, including or consisting of, as illustrative examples: a phenolic, an epoxy, a polyethylene a terephtalate, a vinylester, bismaleimide/diallybisphenol A, a cyanate ester, a nylon, a polypropylene, polyethylene terephthalate, polyethersulfone, polyetheretherketone, acrylonitrile butadiene styrene, a polyamide, a polyethylene, a thermoplastic urethane, or the like, which can be either catalytically or thermally set, or combinations thereof.

The blade shape, thickness, materials, and/or wrapping diameter may be tailored to control deployment characteristics of the furlable antenna blade component 110-b, such as affecting the restraint band and other deployment mechanisms. For example, the successful deployment of the furlable antenna blade component may involve energy input that may be in the form of strain energy. When furled, the furlable antenna blade component 110-b may store the input (flexural) energy, and components like a restraint band may contain this energy until released. The amount of energy in the system may be dependent on the blade shape, thickness, span-wise thickness distribution, materials, wrapping diameter, and/or temperature for example. Variations in these parameters may be implemented to optimize the deployed blade shape, deployment time, and/or dynamic deployment response subjected to the spacecraft or terrestrial craft.

Some embodiments of the furlable antenna blade component 110-b may include one or more surface treatments 113 that may be used between the conductive element 111-b and/or other layers 112-*b* to improve structural performance (e.g., laminae adhesion). For example, bonding between dissimilar materials like composites and conductors may be improved through use of surface treatments applied to the layers. Surface treatments 113 may increase surface roughness and thus surface area which promotes stronger bonds. Surface treatments 113 may also be very thin; therefore, they may not significantly affect the structural performance. Surface treatments 113 may also protect the materials/structures throughout the device's lifetime both during ground and space operations.

Surface treatments 113 may be used to alter radiation absortivity and/or emissivity to control thermal deformations of the furlable antenna blade component 110-*b*. Thermal effects from solar radiation may lead to large temperature gradients on various spacecraft components, for example. Surface treatments 113 may be used to change the radiation absorbtivity and/or emissivity of the spacecraft components, especially the furlable antenna blade components 110-*b*, to better control or manage the resulting component temperatures. Treatments 113 resulting in solid or patterned (treatment) surfaces may be applied. Furthermore, as the furlable antenna blade components 110-*b* may be exposed to long-term creep effects during stowage, shape recovery can be accelerated from high temperature exposure. Thus, the treatments 113 may be focused on improving blade creep recovery time by increasing the component temperature.

FIG. 2B shows an exploded view 110-*c*-1 and a fabricated view 110-*c*-2 of a furlable antenna blade component in accordance with various embodiments. Exploded view 110-*c*-1 may show the multiple layers of the furlable blade component. The layers may include one or more conductive elements 111-*c* with one or more laminate layers 112-*c*-1, 112-*c*-2, 112-*c*-3, 112-*c*-4. The laminate layers 112-*c*-1, 112-*c*-2, 112-*c*-3, 112-*c*-4 may be referred to as reinforcement layers; the conductive element 111-*c* may include a conductive layer in some embodiments. For example, the laminate layers 112-*c*-1, 112-*c*-2, 112-*c*-3, 112-*c*-4 may include four layers, with two layers of different sizes on each side of the conductive element 111-*c*. Exploded view may also show surface treatments 113-*c*-1, 113-*c*-2 with respect to conductive element(s) 111-*c* and/or laminate layers 112-*c*-1, 112-*c*-2, 112-*c*-3, 112-*c*-4. Fabricated view 110-*c*-2 may show the multiple layers integrated together. As shown, the one or more conductive elements 111-*c* and the one or more laminate or reinforcement layers 112-*c*-1, 112-*c*-2 (layers 112-*c*-3, 112-*c*-4 not shown) may form a three-dimensional structure. In some embodiments, the three-dimensional structure is configured such that at least a portion of one or more of the conductive element(s) 111-*c* extends beyond at least a portion of the one or more laminate or reinforcement layers 112-*c*-1, 112-*c*-2 (layers 112-*c*-3, 112-*c*-4 not shown). Surface treatment 113-*c*-1 may be shown coinciding with conductive element(s) 111-*c* (surface treatment 113-*c*-2 not show).

Variations in the number and/or extent of the laminate layers 112 may depend on the degree of bend of different portions of the furlable antenna blade component. For example, portions of the furlable antenna blade component 110 that may involve a tighter bend may have fewer laminate layers, while areas with a gradual bend may have more laminate layers.

FIG. 2C shows another exploded view 110-*d*-1 and a fabricated view 110-*d*-2 of a furlable antenna blade component in accordance with various embodiments. Exploded view 110-*d*-1 may show the multiple layers of the furlable blade component. The layers may include one or more conductive elements 111-*d* with one or more laminate layers 112-*d*-1, 112-*d*-2, 112-*d*-3, 112-*d*-4. The laminate layers 112-*d*-1, 112-*d*-2, 112-*d*-3, 112-*d*-4 may be referred to as reinforcement layers; the conductive element 111-*d* may include a conductive layer in some embodiments. For example, the laminate layers 112-*d*-1, 112-*d*-2, 112-*d*-3, 112-*d*-4 may include four layers, with two layers of different sizes on each side of the conductive element 111-*d*. Conductive element 111-*d* may form a variety of antenna configurations. Merely by way of example, conductive element 111-*d* in FIG. 2C may show a dipole antenna configuration. Fabricated view 110-*d*-2 may show the multiple layers integrated together. The one or more conductive elements 111-*d* (which may coincide with laminate layers 112-*d*-2, 112-*d*-3 and the one or more laminate or reinforcement layers 112-*d*-1, 112-*d*-2 (layers 112-*d*-3, 112-*d*-4 not shown) may form a three-dimensional structure.

Variations in the number and/or extent of the laminate layers 112-*d*-1, 112-*d*-2, 112-*d*-3, 112-*d*-4 may depend on the degree of bend of different portions of the furlable antenna blade component 110-*d*-1, 110-*d*-2. For example, portions of the furlable antenna blade component 110-*d*-2 that may involve a tighter bend may have fewer laminate layers, while areas with a gradual bend may have more laminate layers.

Figure 3A:
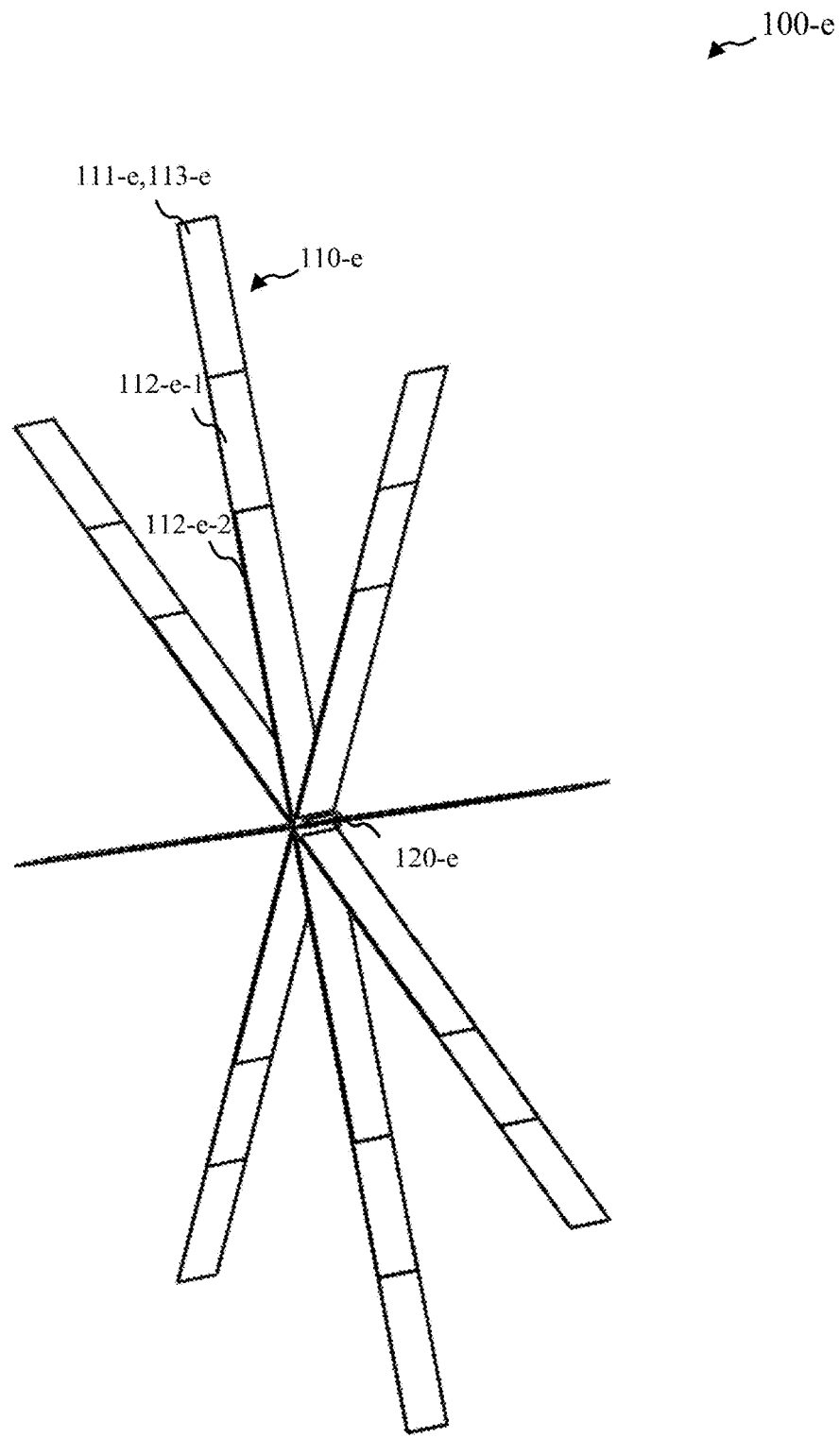
FIG. 3A shows a system in accordance with various embodiments.

Turning now to FIG. 3A, FIG. 3B, FIG. 3C, FIG. 3D, and FIG. 3E, examples of systems 100-*e*, 100-*f*, 100-*g*, 100-*h*, and 100-*i*, respectively, with one or more furlable antenna blade components 110-*e*, 110-*f*, 110-*g*, 110-*h*, 110-*i*, respectively, are provided in accordance with various embodiments. Systems 100-*e*, 100-*f*, 100-*g*, 100-*h*, and/or 100-*i* may be examples of aspects of system 100 of FIG. 1A and/or system 100-*a* of FIG. 1B. Furlable antenna blade components 110-*e*, 110-*f*, 110-*g*, 110-*h*, and/or 110-*i* may be examples of furlable antenna blade components 110 of FIG. 2A. For example, FIG. 3A shows an example of a system 100-*e* in accordance with various embodiments. System 100-*e* may include multiple furlable antenna blade components 110-*e*; system 100-*e* may show six blade components, with one blade component 110-*e* called out as an example. System 100-*e* may also include one or more antenna blade support components 120-*e*. This embodiment may show an example of unfurled antenna blade components 110-*e* with a general rectangular shape. The antenna blade components 100-*e* may include a layered structure with one or more conductive elements 111-*e* and one or more laminate and/or reinforcement layers 112-*e*-1, 112-*e*-2 (additional laminate layers may not be shown); some embodiments may also include one or more surface treatments 113-*e*, which may be shown coinciding with the shown portion of the one or more conductive elements 111-*e*. As may be seen, the shown layers 111-*e*, 112-*e*-1, 112-*e*-2 may form a three-dimensional structure, where some of the layers may not fully overlap with each other. A variety of different antenna blade components may be utilized in accordance with various embodiments. For example, embodiments may include, but are not limited to, dipole antenna blade components, quadrupole antenna blade components, Vivaldi antenna blade components, planar array antenna blade components, and/or slot antenna blade components.

Figure 3C:
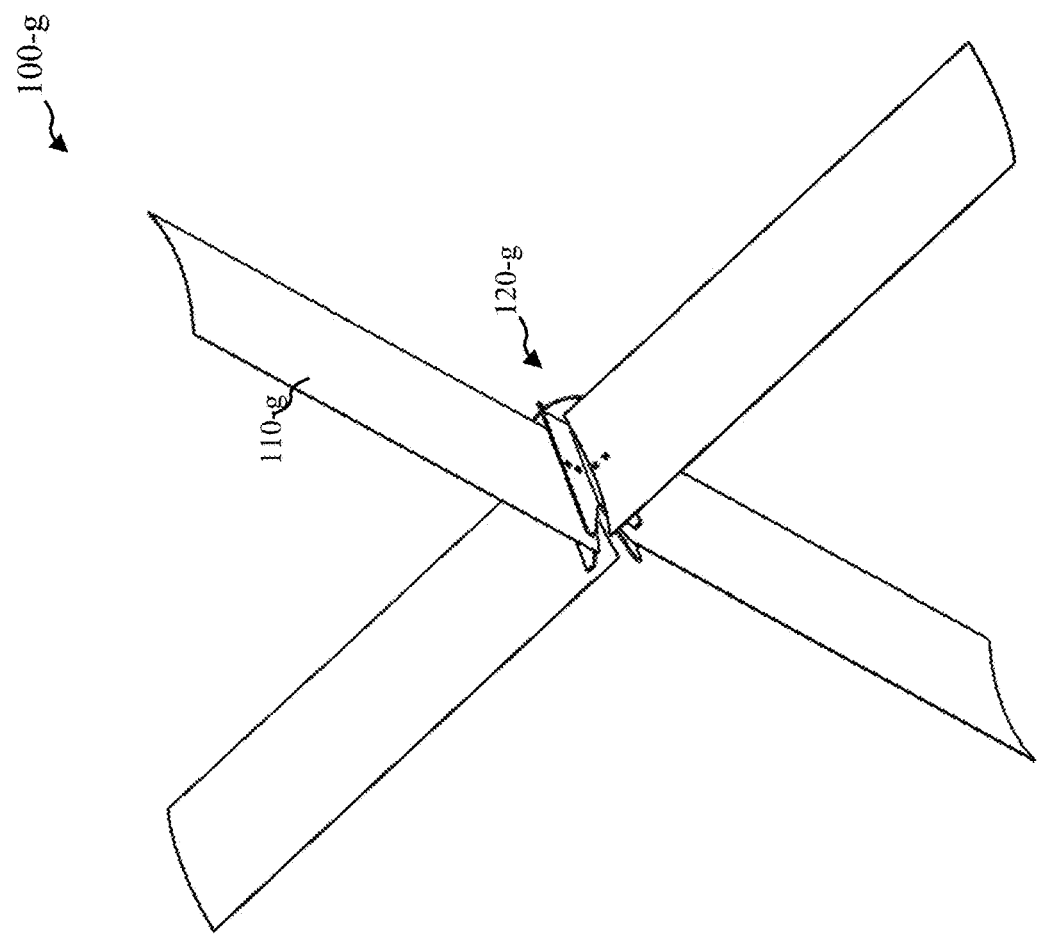
FIG. 3C shows a system in accordance with various embodiments.
Figure 3B:
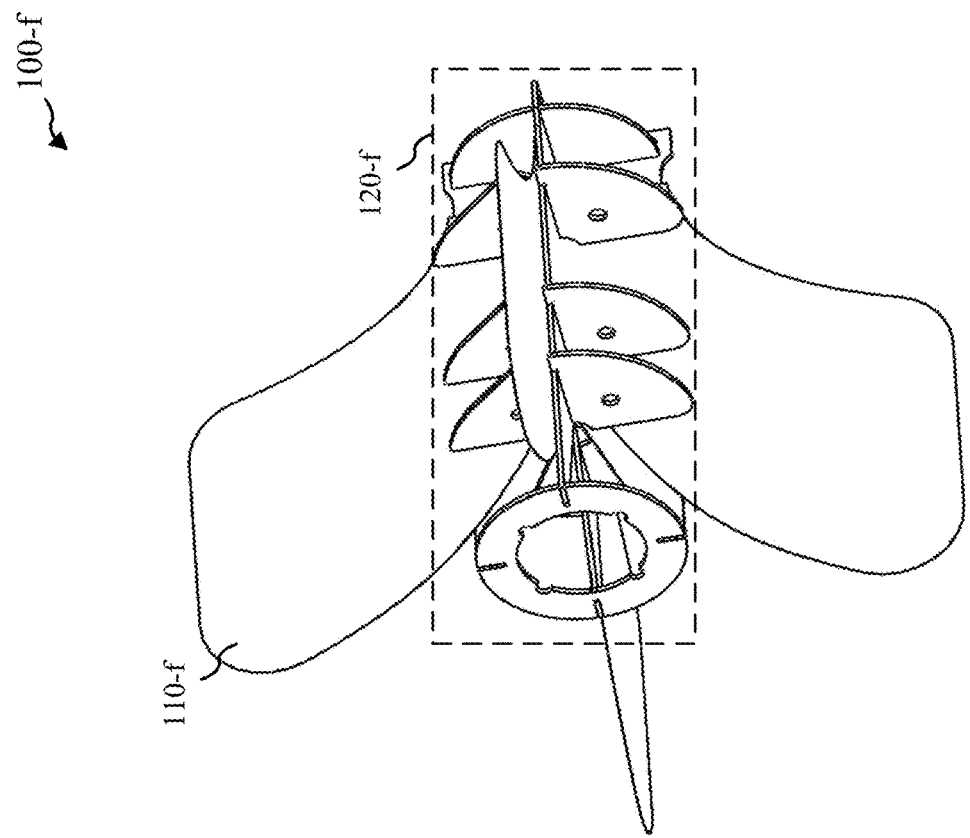
FIG. 3B shows a system in accordance with various embodiments.

FIG. 3B shows a system 100-*f* that may include multiple furlable antenna blade components 110-*f* and one or more antenna blade support components 120-*f*. System 100-*f* may show four furlable antenna blade components, with one exemplary furlable antenna blade components 110-*f* called out as an example. The multiple furlable antenna blade components 110-*f* may be configured as Vivaldi antenna blade components. The one or more antenna blade support components 120-*f* may be configured to control a degree of bend of the one or more furlable antenna blade components 110-*f* when furled. In some embodiments, the one or more antenna blade support components 120-*f* may be configured to form a conical shape such that the one or more antenna blade components 110-*f* spiral around the antenna blade support components 120-*f* when furled. The conical forming shaping of the one or more antenna blade support components 120-*f* may result in the one or more furlable antenna blade components 110-*f* forming a conical shape rather than a cylindrical shape when stowed.

FIG. 3C shows another system 100-*g* that may include multiple furlable antenna blade components 110-*g* and one or more antenna blade support components 120-*g*. System 100-*g* may show four furlable antenna blade components, with one exemplary furlable antenna blade components 110-*g* called out as an example. The multiple furlable antenna blade components 110-*g* may be configured to be curved, which may add structural depth to the furlable antenna blade component. In some embodiments, one or more antenna blade support components 120-*g* may be configured to control a degree of bend of the one or more furlable antenna blade components 110-*g* when furled.

FIG. 3D shows another system 100-*h* that may include multiple furlable antenna blade components 110-*h*, one or more antenna blade support components 120-*h*, and one or more stabilizers 121. System 100-*h* may show four furlable antenna blade components, with one exemplary furlable antenna blade components 110-*h* called out as an example. In some embodiments, one or more stabilizers 121 are configured to slide relative the one or more conductive elements of the one or more furlable antenna blade components 110-*h* when furled. The one or more antenna blade support components 120-*h* may be configured to control a degree of bend of the one or more furlable antenna blade components 110-*h* when furled. In some embodiments, the one or more antenna blade support components 120-*h* may be configured to form a conical shape such that the one or more antenna blade components 110-*h* spiral around the antenna blade support components 120-*h* when furled. FIG. 3D also provide an enlarged portion to highlight several aspects of system 100-*h*. For example, one or more brackets 122 may be utilized to allow the stabilizer 121 to support the furlable antenna blade component while also allow the stabilizer 121 to move relative to the furlable antenna blade component 110-*h*. Stabilizer 121 may be configured in a variety of ways to facilitate deployment, such as a tape spring mechanism, slit-tube boom construction, or other configurations. Stabilizer 121 may be coupled with a portion of the furlable antenna blade component 110-*h* utilizing bolts, clips, or rivets 123, for example. In some embodiments, the stabilizer 121 may form a flattened configuration when the system is in a furled state.

Figure 3E:
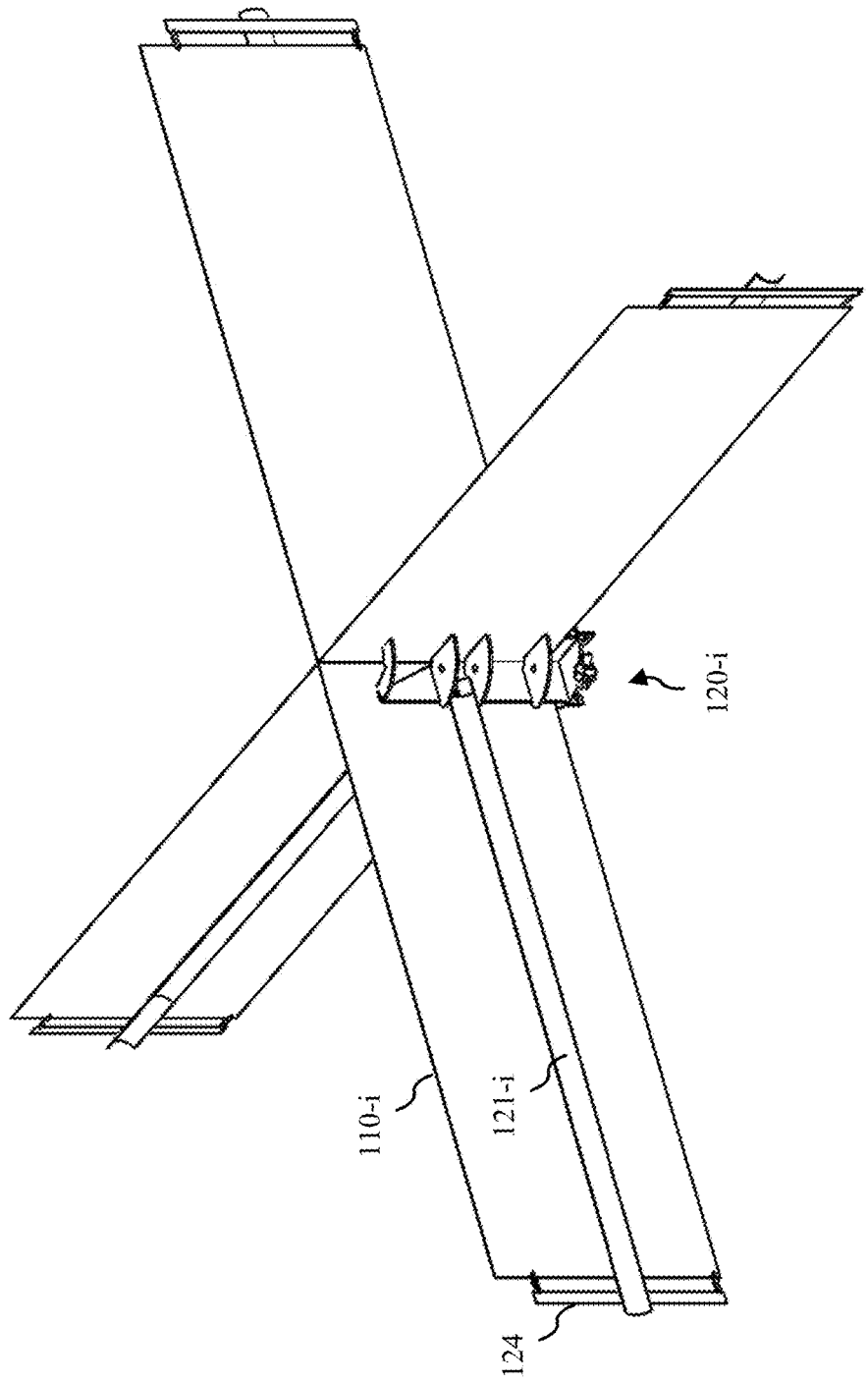
FIG. 3E shows a system in accordance with various embodiments.

FIG. 3E shows another system 100-*i* that may include multiple furlable antenna blade components 110-*i*, one or more antenna blade support components 120-*i*, and one or more stabilizers 121-*i*. System 100-*i* may show four furlable antenna blade components, with one exemplary furlable antenna blade components 110-*i* called out for example. In some embodiments, one or more stabilizers 121-*i* are configured to slide relative the one or more conductive elements of the one or more furlable antenna blade components 110-*i* when furled. The one or more stabilizers 121-*i* may be coupled with a distal end of respective furlable antenna blade components 110-*i* such that the furlable antenna blade components 110-*i* may be tensioned, which may utilize a tension bar 124 in some embodiments. The one or more antenna blade support components 120-*i* may be configured to control a degree of bend of the one or more furlable antenna blade components 110-*i* when furled. In some embodiments, the one or more antenna blade support components 120-*i* may be configured to form a conical shape such that the one or more antenna blade components 110-*i* spiral around the antenna blade support components 120 when furled. The use of stabilizers 121-*i* and other components as may be shown in FIG. 3D and/or FIG. 3E may facilitate the use of furlable antenna blade components 110-*i* that may be constructed utilizing conductive elements with or without the use of reinforcement layers. For example, some embodiments may utilize furlable antenna blade components, such as the one or more furlable antenna blade component 110-*h* and/or 110-*i* that may include single metal layer elements, such as a single beryllium metal layer.

Turning now to FIG. 4A, FIG. 4B, FIG. 4C, FIG. 4D, and FIG. 4E, a system 100-*j* in accordance with various embodiments at various stages of deployment are provided. System 100-*j* may be an example of aspects of system 100 of FIG. 1A and/or system 100-*a* of FIG. 1B, for example.

Figure 4A:
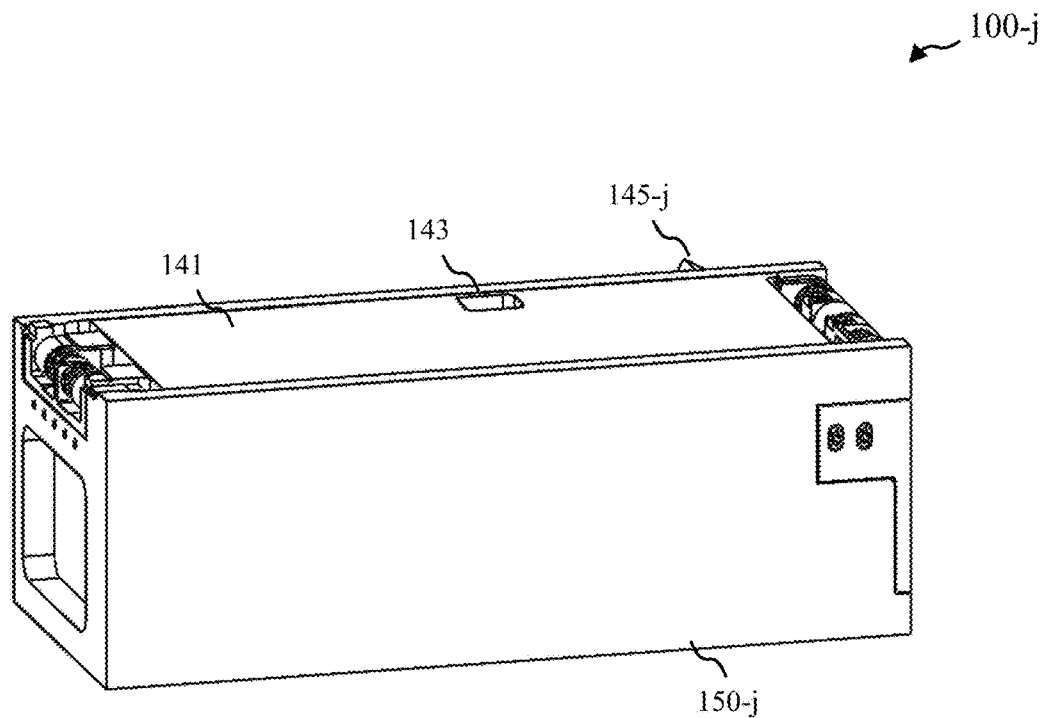
FIG. 4A shows a system in accordance with various embodiments.

In FIG. 4A, the system 100-*j* may be shown prior to deployment. A restraint lid 141 may be held via a release device 145-*j*. The release device 145-*j* may be triggered such that the restraint lid 141 is free to swing open from the storage compartment 150-*j*. For example, a spacecraft bus may trigger the release device 145-*j*. In some embodiments, restraint lid 141 includes at least one aperture 143 configured to hold a restraint band release component (see, e.g., restraint band release component 162-*j* of FIG. 4B, restraint band release component 162-*o* of FIG. 9) in place when the one or more furlable antenna blade components are furled and stowed within the storage compartment 150-*j*.

Figure 4B:
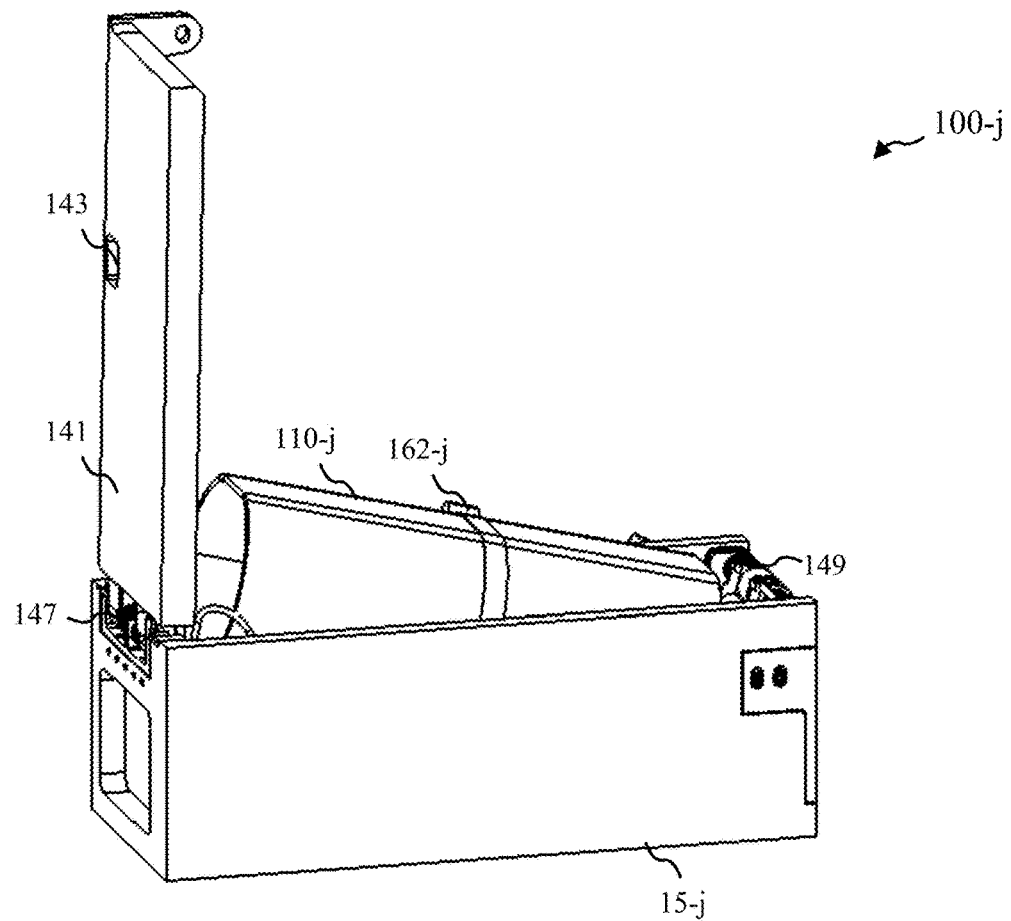
FIG. 4B shows a system in accordance with various embodiments.

In FIG. 4B, the system 100-*j* may be shown as the restraint lid 141 may open. One or more torsion springs 147 may be utilized to facilitate this process. The furled antenna blade component(s) 110-*j* may deploy, or rotate, out from the storage compartment 150-*j*, via independent torsional springs 149 in some embodiments.

Figure 4C:
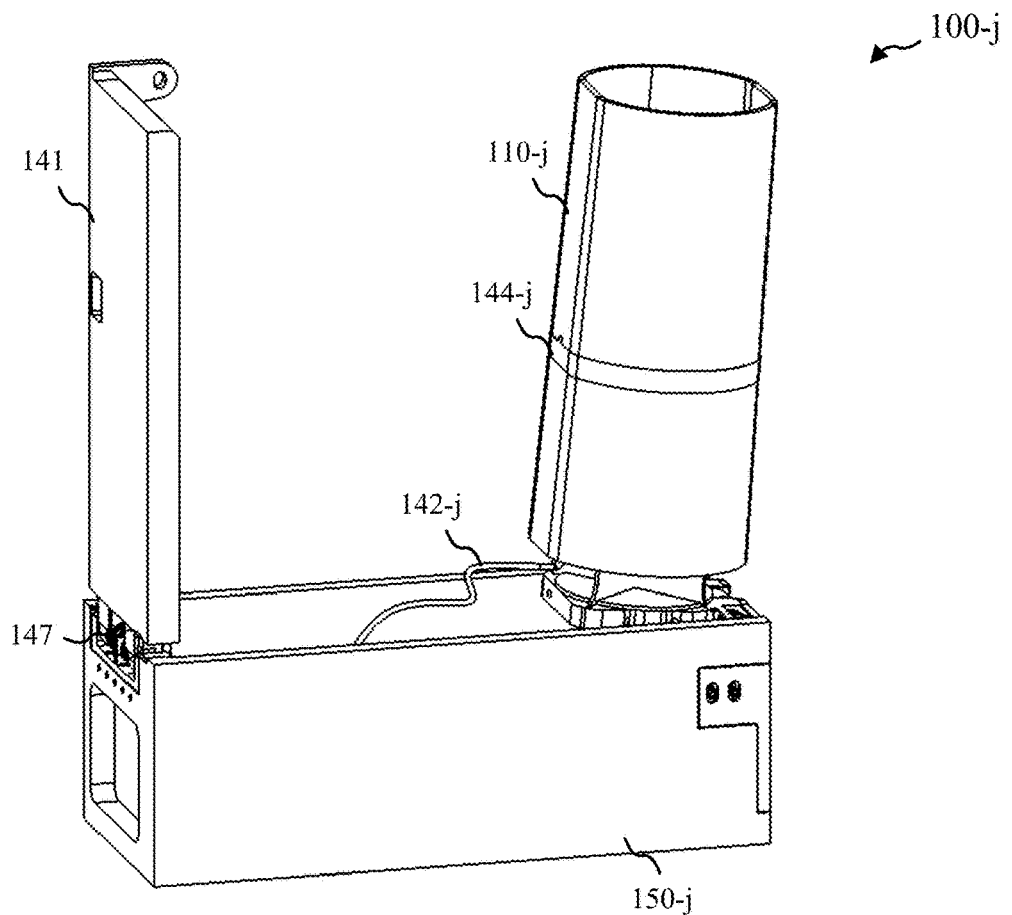
FIG. 4C shows a system in accordance with various embodiments.

In FIG. 4C, system 100-*j* may be shown as the furled antenna blade components 110-*j* continue to rotate out from the storage compartment 150-*j*. In some embodiments, one or more torsional springs 147 may be sized to ensure the restraint lid 141 clears the furled antenna blades components 110. A restraint band pull-off cable or rod (see, e.g., FIG. 10B, ref no. 175 and/or FIG. 11A, ref no. 175-*q*) may be configured such it may be engaged or tensioned at a certain stage of deployment, such as approximately halfway through deployment. System 100-*j* may also include one or more cables 142-*j* for power, ground, and/or communication links; cable 142-*j* may include services looks that may facilitate the one or more cables 142-*j* from twisting during deployment. The restraint band 144-*j* may be removed such that the furled antenna blades components 110-*j* are free to unfurl. The restraint band 144-*j* may have been removed at this point such that the furled antenna blades components 110-*j* are free to unfurl.

Figure 4D:
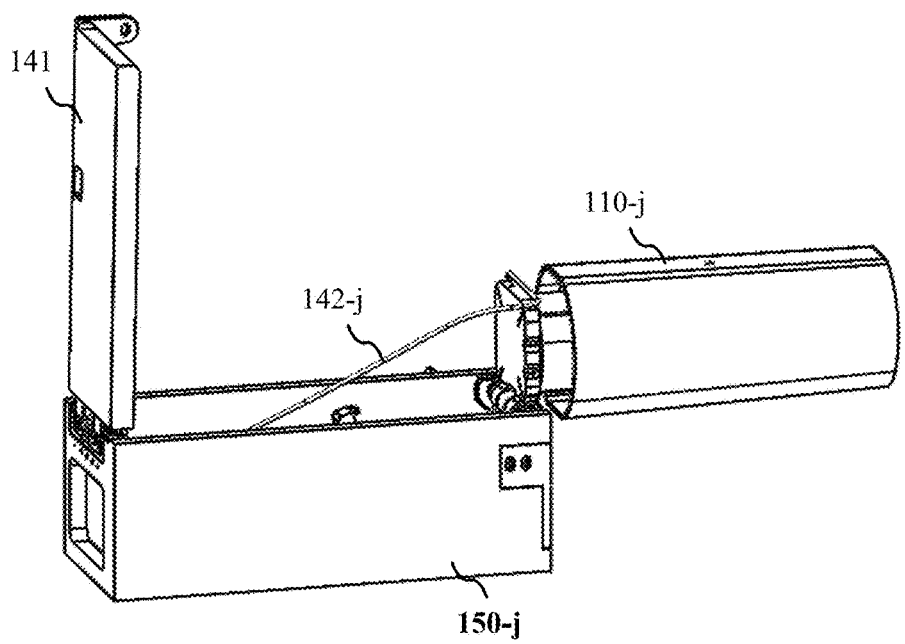
FIG. 4D shows a system in accordance with various embodiments.

In FIG. 4D, system 100-*j* may be shown when the furled antenna blade components 110-*j* have fully rotated out of the storage compartment 150-*j* and stopped. The furled antenna blade components 110-*j* may form a conical shape rather than a cylindrical shape when stowed and during different stages of deployment before the furled antenna blade components 110- are unfurled; one or more antenna blade support components, such as antenna blade support components 120-*j* as seen in FIG. 4E, may provide a conical forming shaping that may result in the one or more furlable antenna blade components 110-*j* forming the conical shape when furled.

Figure 4E:
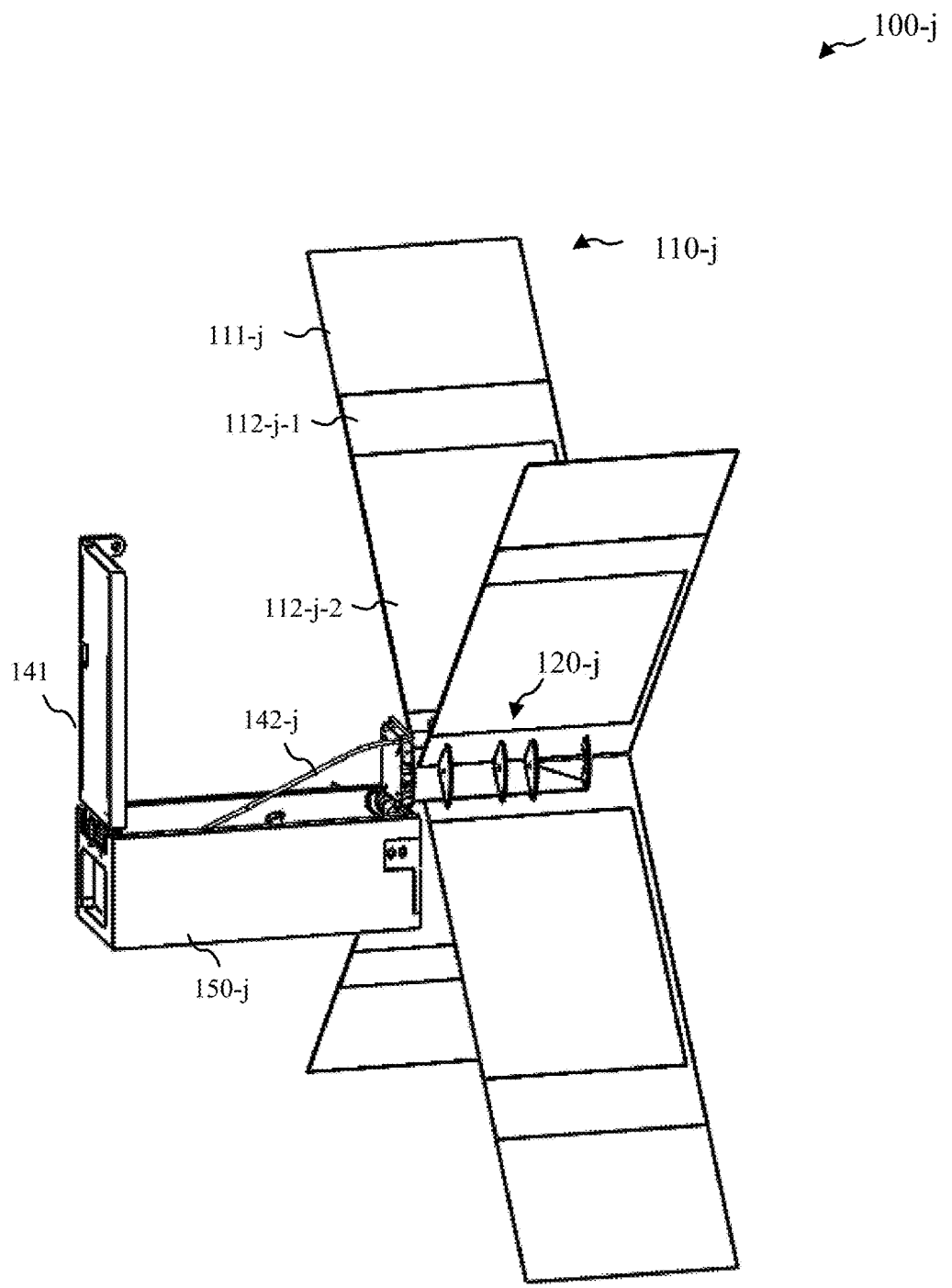
FIG. 4E shows a system in accordance with various embodiments.

In FIG. 4E, system 100-*j* may be shown where the furlable antenna blade components 110-*j* have unfurled and extended. FIG. 4E may also show antenna blade component support(s) 120-*j*. In this embodiment, the furlable antenna blade components 110-*j* may include four blades, which may include a layered structure with one or more conductive elements or layers 111-*j* and one or more laminate layers 112-*j*-1, 112-*j*-2; additional laminate layers may be obscured from view. The laminate layers 112-*j*-1, 112-*j*-2 may overlap such that a tighter bend may be accommodated near where each furlable antenna blade component 110-*j* may be coupled with the antenna blade support component 120-*j*.

Turning now to FIG. 5A and FIG. 5B, a system 100-*k* in accordance with various embodiments is shown at various stages of deployment, such as a stowed state as may be shown in FIG. 5A and a deployed state as may be shown in FIG. 5B. System 100-*k* may be an example of aspects of system 100 of FIG. 1A and/or system 100-*a* of FIG. 1B.

FIG. 5A and/or FIG. 5B may show a storage compartment 150-*k* with a restraint lid 141-*k* and one or more furlable antenna blade components 110-*k*. System 100-*k* may also include linear rails 152 and a compressed deployment spring 154. The linear rails 152 may be configured as a cassette mechanism. System 100-*k* may also show a release mechanism 145-*k*, a base plate 156, and/or an RF electronics box 158.

FIG. 5A may show a stage where the one or more furlable antenna blade components 110-*k* may be stored or stowed within the storage compartment 150-*k* and/or canister. FIG. 5B may show a stage where the one or more furlable antenna blade components 110-*k* may be deployed and/or unfurled.

System 100-*k* may provide examples of linear slide and stop configured for linear deployment of the one or more furlable antenna blade components 110-*k* from a storage compartment 150-*k* and/or canister. Some embodiments include one or more linear springs 154 configured for linear deployment of the one or more furlable antenna blade components 110-*k* from a storage compartment 150-*k*.

Figure 6:
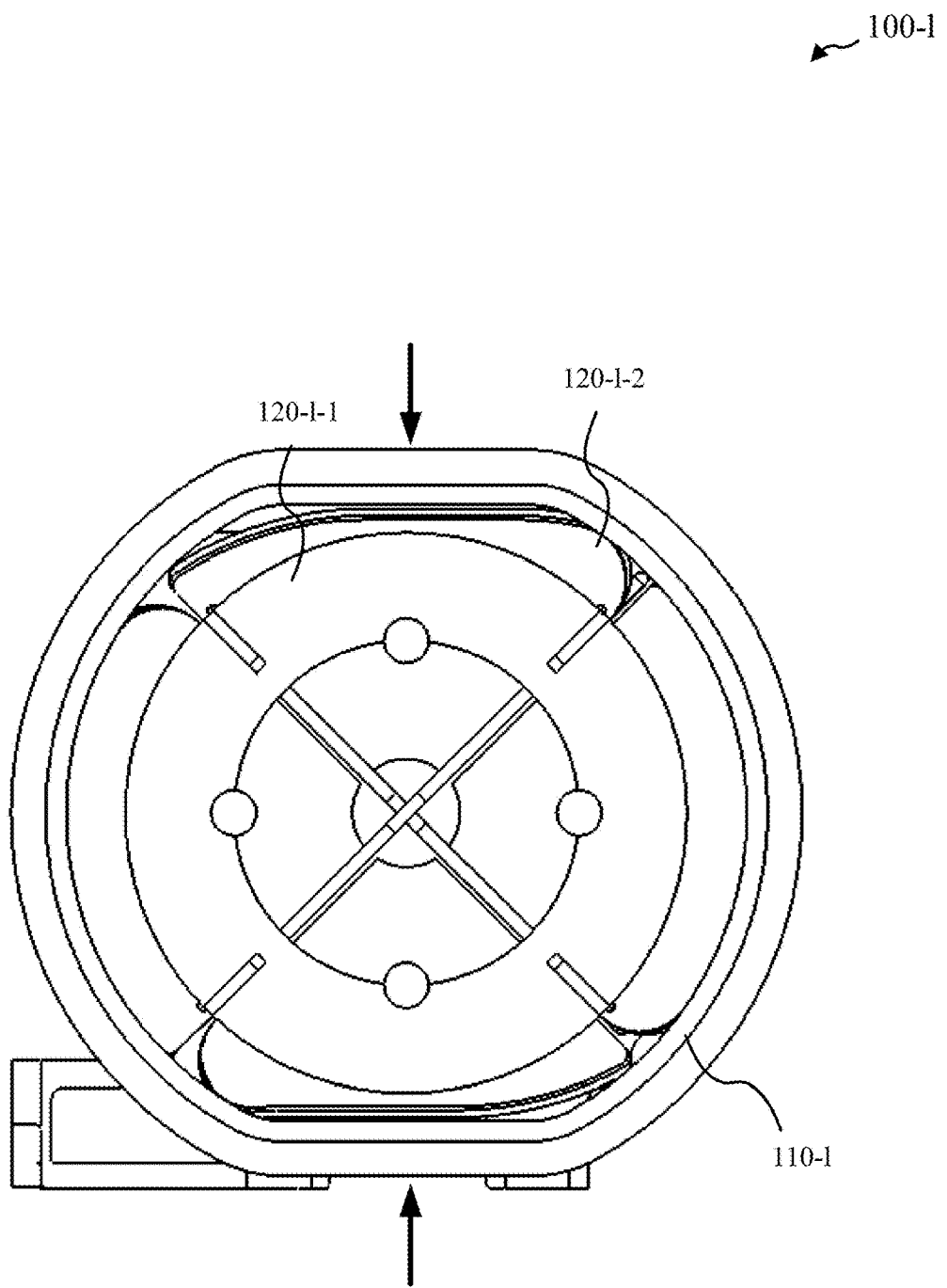
FIG. 6 shows a system in accordance with various embodiments.

FIG. 6 shows aspects of a system 100-*l* in accordance with various embodiments. System 100-*l* may be an example of aspects of system 100 of FIG. 1A and/or system 100-*a* of FIG. 1B. Furlable antenna blade components 110-*l* may be examples of furlable antenna blade components 110-*b* of FIG. 2A, components 110-*c* of FIG. 2B, and/or components 110-*d* of FIG. 2C, for example. FIG. 6 may show an example of one or more antenna blade support components 120-*l*-1, 120-*l*-2 configured to control a degree of bend of the one or more furlable antenna blade components 110-*l* when furled. Antenna blade support components 120-*l*-1 may also may include conical shaped components configured such that the one or more antenna blade components 110-*l* spiral around the conical shaped component when furled. The furled antenna blade components 110-*l* may also be compressed along a vertical axis as shown in FIG. 6. The two arrows shown in FIG. 6 may show a load being applied to two sides of the furled one or more furlable antenna blade components 110-*l*; this may result in the two flattened portions on the top and bottom of the furled one or more furlable antenna blade components 110-*l*. The furled or wrapped one or more furlable blade components 110-*l* may thus be compressed when preloaded during compression.

Figure 7A:
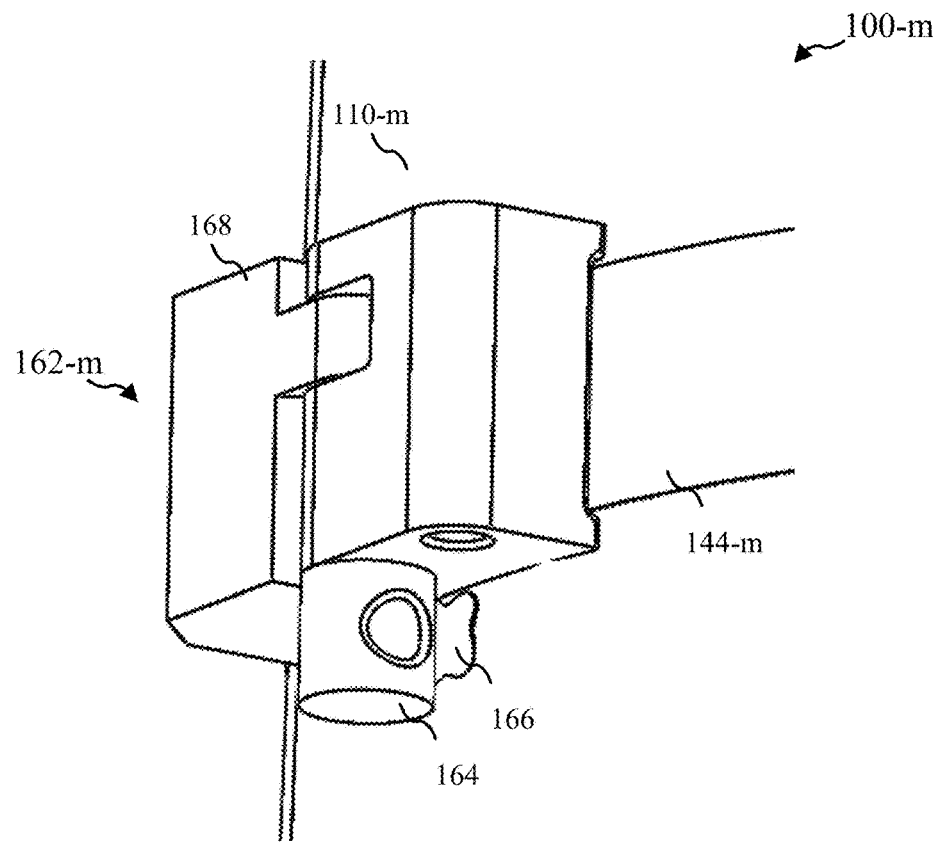
FIG. 7A shows a system in accordance with various embodiments.
Figure 7B:
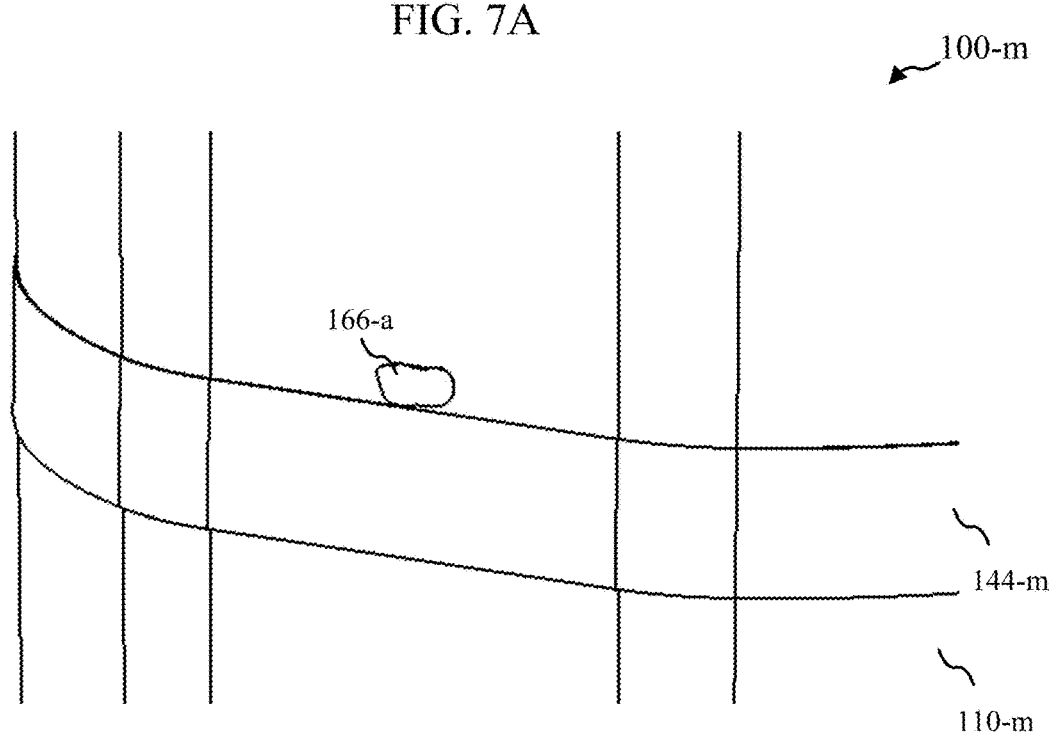
FIG. 7B shows a system in accordance with various embodiments.

Turning now to FIG. 7A, FIG. 7B, FIG. 7C, and FIG. 7D, different aspects of a system 100-*m* in accordance with various embodiments are provided. System 100-*m* may be an example of aspects of system 100 of FIG. 1A and/or system 100-*a* of FIG. 1B. In general, these figures may relate to components related to release components for one or more furlable antenna blade components. For example, FIG. 7A shows aspects of system 100-*m* that may include one or more furlable antenna blade components 110-*m* in a furled state utilizing one or more restraint band release components 162-*m* in accordance with various embodiments. FIG. 7A may include a release pin component 164 that may be configured to release the restraint band release component 162-*m* from around one or more furled antenna blade components 110-*m*. FIG. 7A may also show one or more end fittings 168 for the restraint band release component 162-*m*. Furthermore, at least one or more furlable antenna blade components 110-*m* may be configured such that the restraint band component 144-*m* may avoid slippage during deployment of the one or more furlable antenna blade components 110-*m*; for example, a protrusion 166 may be formed with respect to at least one of the furlable antenna blade components 110-*m*. In some embodiments, the protrusion 166 may be formed from a material, such as epoxy, that may be coupled with the furlable antenna blade component 110-*m*. FIG. 7B shows another example of at least one or more furlable antenna blade components 110-*m* that may be configured such that the restraint band component 144-*m* may avoid slippage during deployment of the one or more furlable antenna blade components 110-*m*; for example, a protrusion 166-*a* may be formed with respect to at least one of the furlable antenna blade components 110-*m*. Protrusion 166-*a* may be on an opposite of the restraint band component 144-*m* with respect to the protrusion 166 shown in FIG. 7A.

Figure 7C:
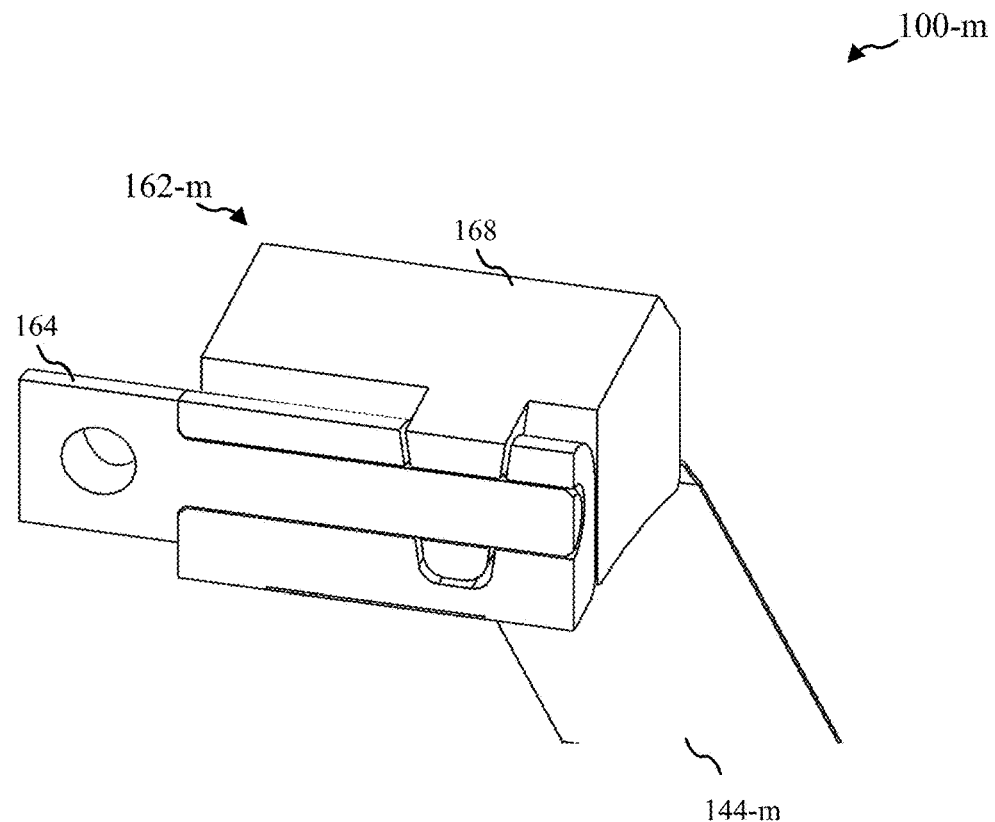
FIG. 7C shows a system in accordance with various embodiments.
Figure 7D:
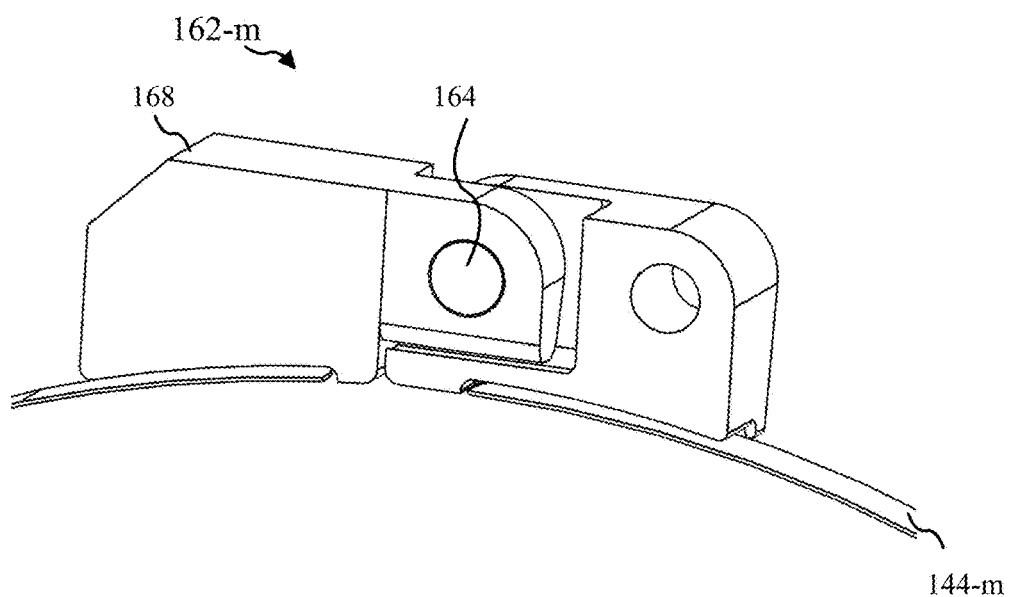
FIG. 7D shows a system in accordance with various embodiments.

FIG. 7C may show the release pin component 164 along with end fitting 168 for the restraint band component 162-*m*. In some embodiments, the pin 164 may be stainless steel. Lug components of the end fitting 168 may be asymmetric and/or angled to reduce binding during pin extraction. FIG. 7D may show the lug components of the end fitting 168 along with the restraint band component 144-*m*. The end fittings 168 may be bonded to the restraint band 144-*m*. In some embodiments, the restraint band 144-*m* may be made from stainless spring steel.

Figure 8A:
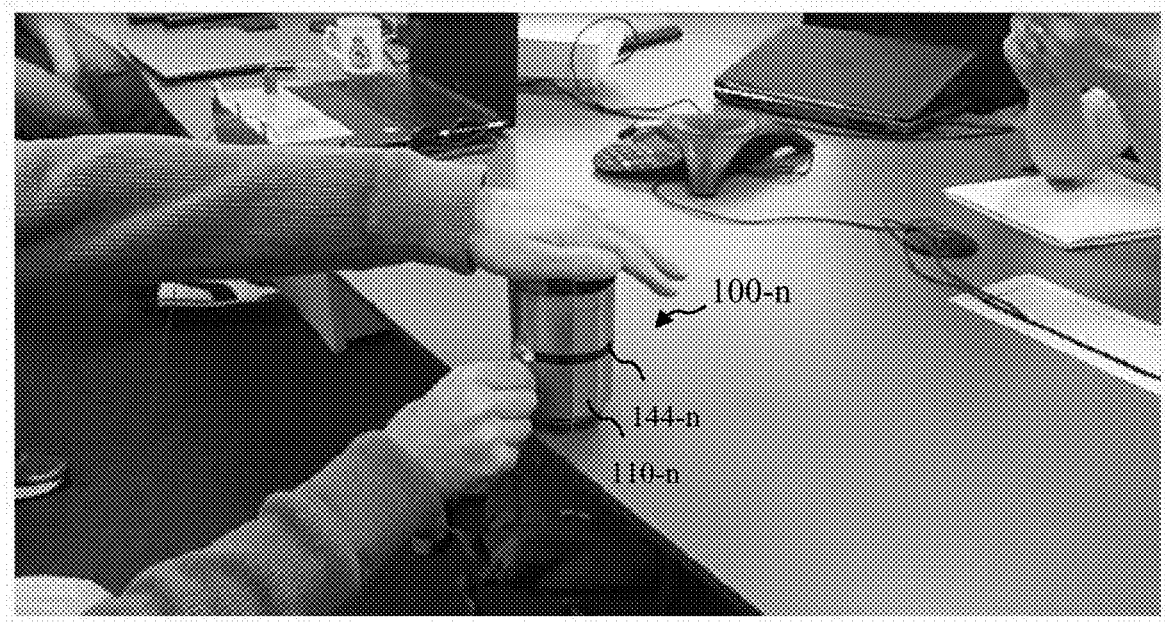
FIG. 8A shows a system in accordance with various embodiments.
Figure 8B:
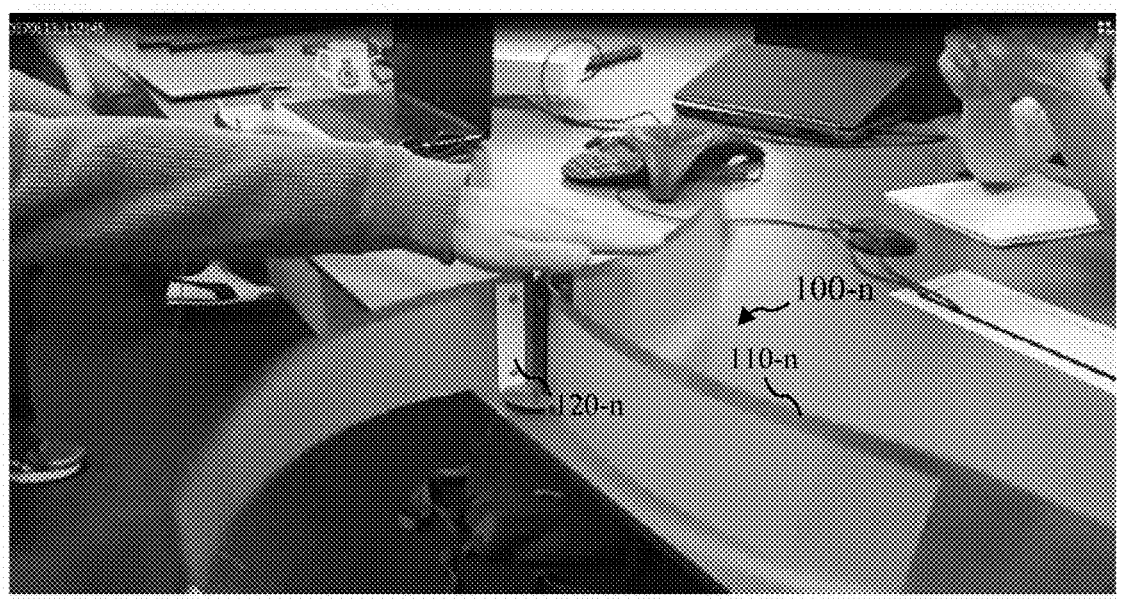
FIG. 8B shows a system in accordance with various embodiments.

FIG. 8A and FIG. 8B show photographs 801 and 802 of aspects of a system 100-*n* accordance with various embodiments. System 100-*n* may be an example of aspects of system 100 of FIG. 1A and/or system 100-A of FIG. 1B. Photograph 801 may show an example of one or more furled antenna blade components 110-*n* held with a restraint band 144-*n*; release components are being initiated to release manually the restraint band 144-*n* and deploy the one or more furlable antenna blade components 110-*n*. The mid-deployed furlable antenna blade components 110-*n* may be shown in photograph 802. Antenna blade support component 120-*n* may also be shown.

FIG. 9 shows aspects of a restraint lid 141-*o* in accordance with various embodiments, which may be an example of aspects of system 100 of FIG. 1A and/or system 100-*a* of FIG. 1B. FIG. 9 may show the restraint lid 141-*o* along with a foam layer 172. In some embodiments foam layer 172 may be encapsulated. For example, the foam layer 172 may be encapsulated with Kapton. In some embodiments, foam layer 172 may facilitate application compression to one of more furlable antenna blade components when stowed in a storage compartment. FIG. 9 may also show one or more rotational hinges 179-*o* for rotational opening of the restraint lid 141-*o* with respect a storage compartment. Some embodiments include one or more torsion springs 147-*o* configured for the rotational opening of the restraint lid 141-*o* with respect to a storage compartment. An aperture 143-*o* may also be shown. The enlarged portion of the restraint lid 141-*o* with aperture 143-*o* may be configured to hold a restraint band release component 162-*o* in place when one or more furlable antenna blade components are furled and stowed within a storage compartment. The aperture 143-*o* may include one or more extrusions that may lock aspects of the restraint band release component 162-*o*, such as pin 164-*o* of the restraint band release component 162-*o*, into the restraint band release component 162-*o*, which may prevent premature release.

Figure 10A:
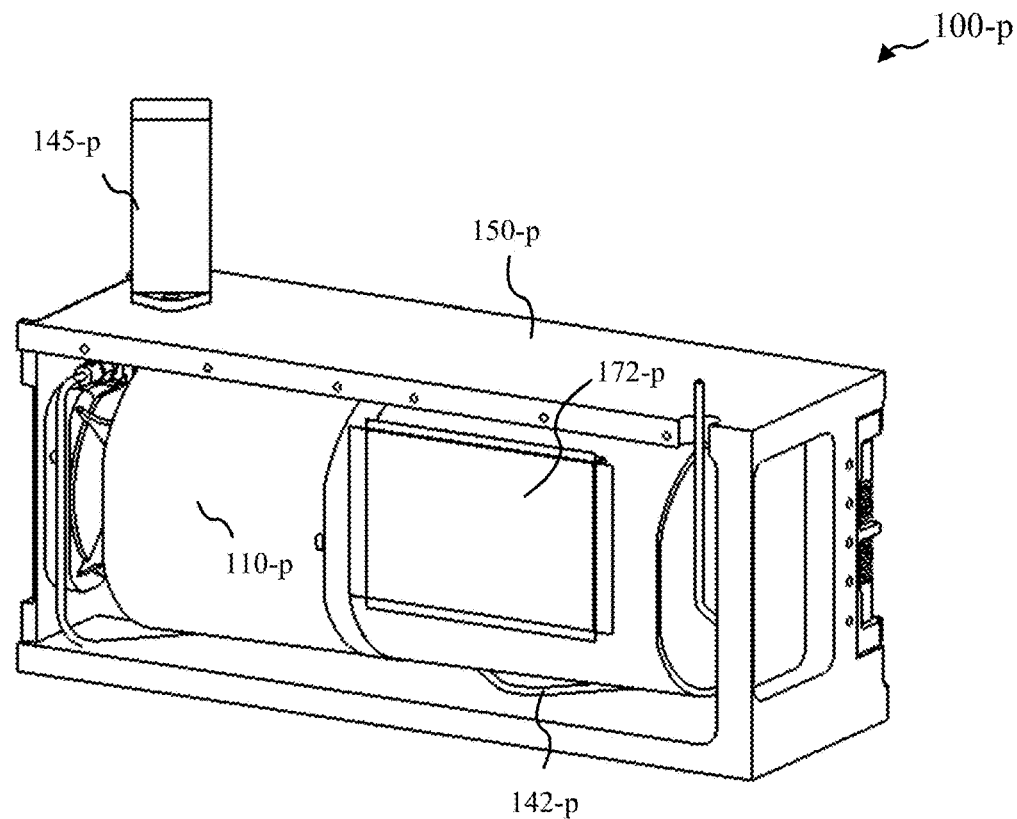
FIG. 10A shows a system in accordance with various embodiments.

Turning now to FIG. 10A, FIG. 10B, FIG. 10C, and FIG. 10D, aspects of a system 100-*p* are shown from a variety of perspectives in accordance with various embodiments. System 100-*p* may be an example of aspects of system 100 of FIG. 1A and/or system 100-*a* of FIG. 1B. These figures may show aspects of a stowed configuration for one or more furlable antenna blade components 110-*p*. FIG. 10A may show a bottom perspective with a bottom portion of a storage compartment 150-*p* removed to show the bottom portion of the one or more furlable antenna blade components 110-*p* in a furled state. Additional components may be shown in this figure and the others, such as a release device 145-*p* (such as a hold down and release mechanism (HDRM)) that may be triggered such that a restraint lid may be free to swing open from the storage compartment 150-*p*. A foam layer 172-*p*, which may include an encapsulated foam layer and may be part of the restraint lid, may also be shown. One or more cables 142-*p* may be coupled with the one or more furlable antenna blade components 110-*p* and may be configured to provide at least a power link, a ground link, or a communication link for the one or more furlable antenna blade components 110-*p*.

Figure 10B:
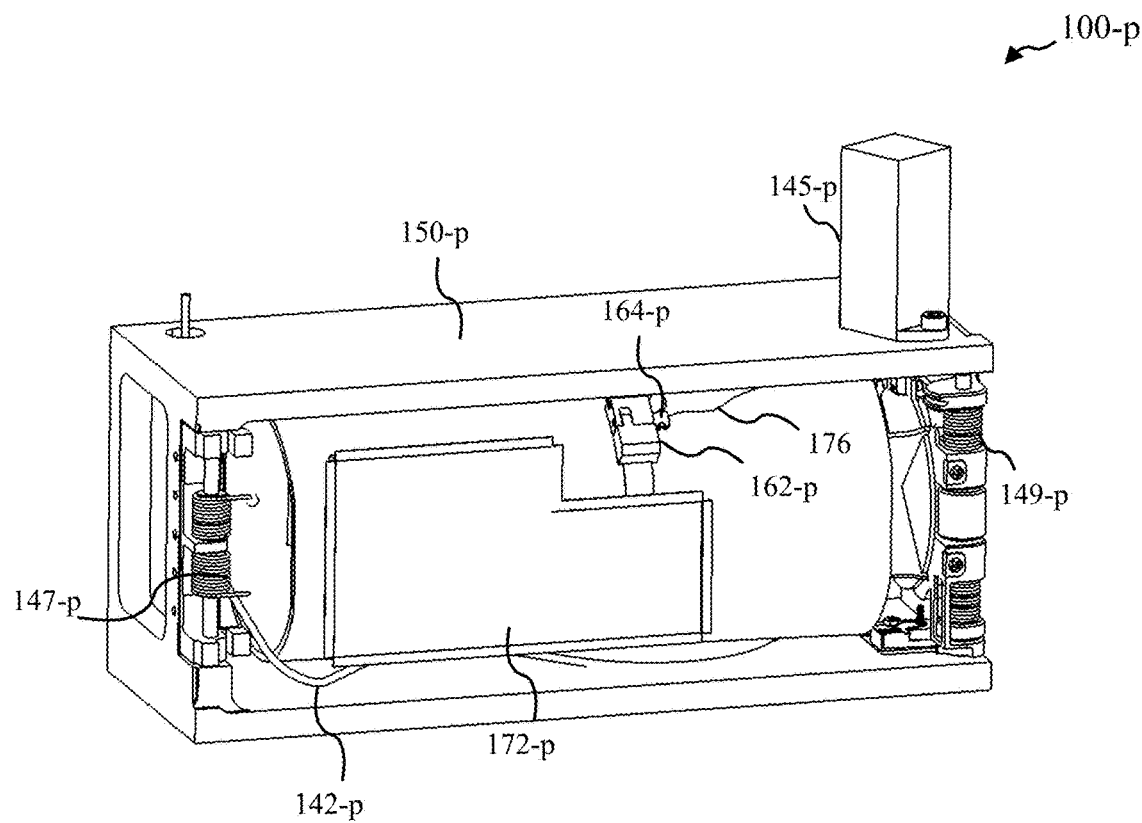
FIG. 10B shows a system in accordance with various embodiments.

In some embodiments, the one or more cables 142-*p* may be configured to avoid twisting during deployment of the one or more furlable antenna blade components 110-*p*; for example, one or more service loops may be utilized. In some embodiments, the one or more cables 142-*p* may be very stiff in torsion, so the one or more cables 142-*p* may be routed such that during deployment, the one or more cables 142-*p* may be forced to only bend, which may make it more compliant and may reduce parasitic energy loss. FIG. 10B shows a top perspective of the storage compartment 150-*p* with a portion of a restraint lid removed. In this figure, another foam layer 172-*p* may be shown, along with restraint band release components 162-*p* along with a tether 176 that may be coupled with the release pin component 164-*p* of the restraint band release components 162-*p* such that the one or more furlable antenna blade components 110-*p* are unfurled at a specific point during deployment. In some embodiments, tether 176 may include a more rigid configuration, such as a rod. One or more torsional springs 147-*p* may be utilized to facilitate opening of a restraint door (foam layer 172-*p* of restraint lid may be shown; foam layer 172-*p* may facilitate compressing the one or more furled antenna blade components 110-*p*). One or more torsional springs 149-*p* may be utilized to facilitate deployment of the one or more furlable antenna blade components 110-*p* from the storage compartment.

Figure 10C:
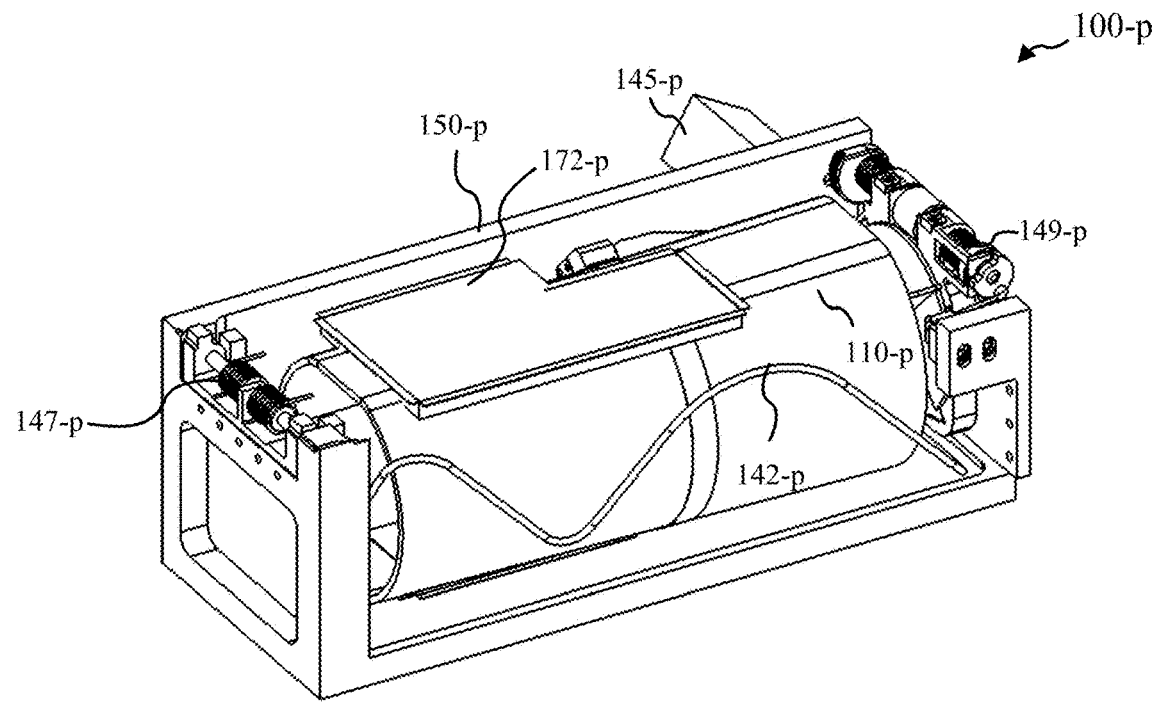
FIG. 10C shows a system in accordance with various embodiments.
Figure 10D:
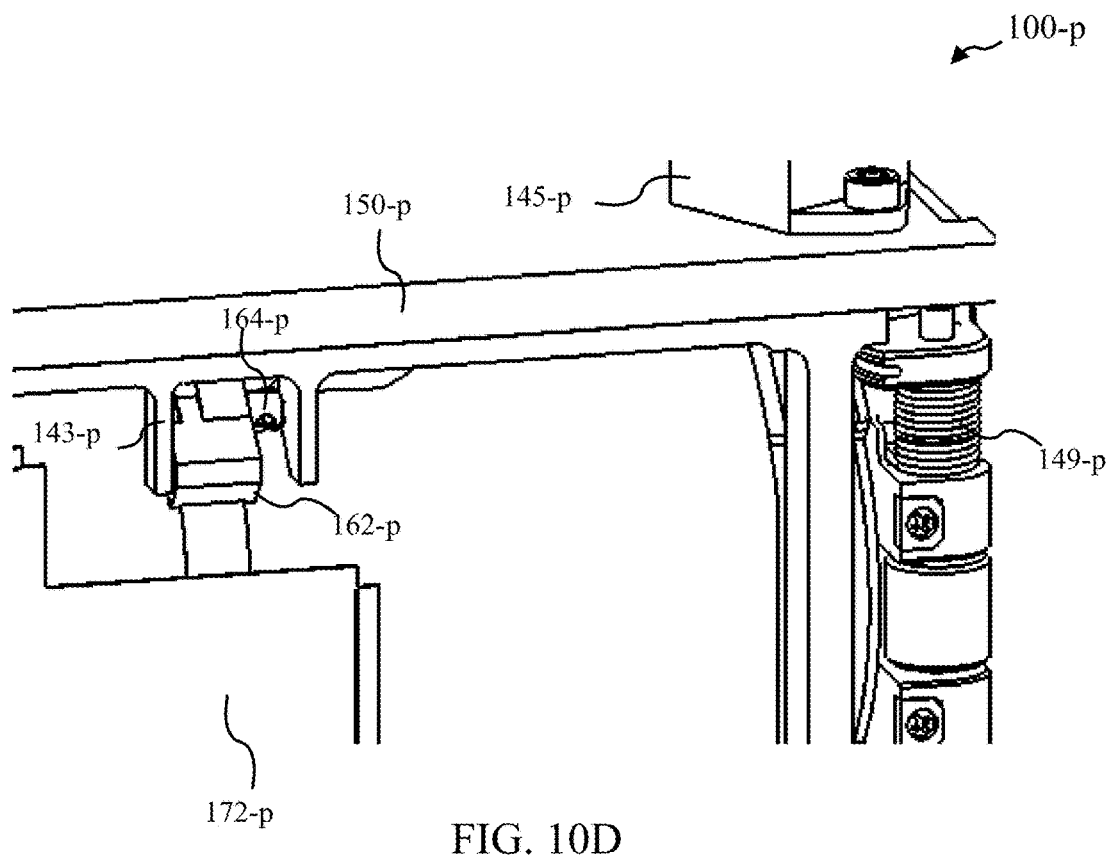
FIG. 10D shows a system in accordance with various embodiments.

FIG. 10C shows a side view with both a side of the storage compartment 150-*p* removed along with a portion of the restraint lid removed. FIG. 10C includes cable 142-*p* that may be shown such that it may avoid twisting during deployment of the one or more furlable antenna blade components 110-*p*. FIG. 10D may then show a portion of system 100-*p* with a portion of restraint lid removed; however, an aperture 143-*p* portion of the restraint lid remains that may be configured to hold restraint band release component 162-*p* in place when the one or more furlable antenna blade components 110-*p* are furled and stowed within the storage compartment 150-*p*. The aperture 143-*p* may include one or more extrusions that may lock aspects of the restraint band release component 162-*p*, such as pin 164-*p* of the restraint band release component 162-*p*, into the restraint band release component 162-*p*, which may prevent premature release.

Figure 11A:
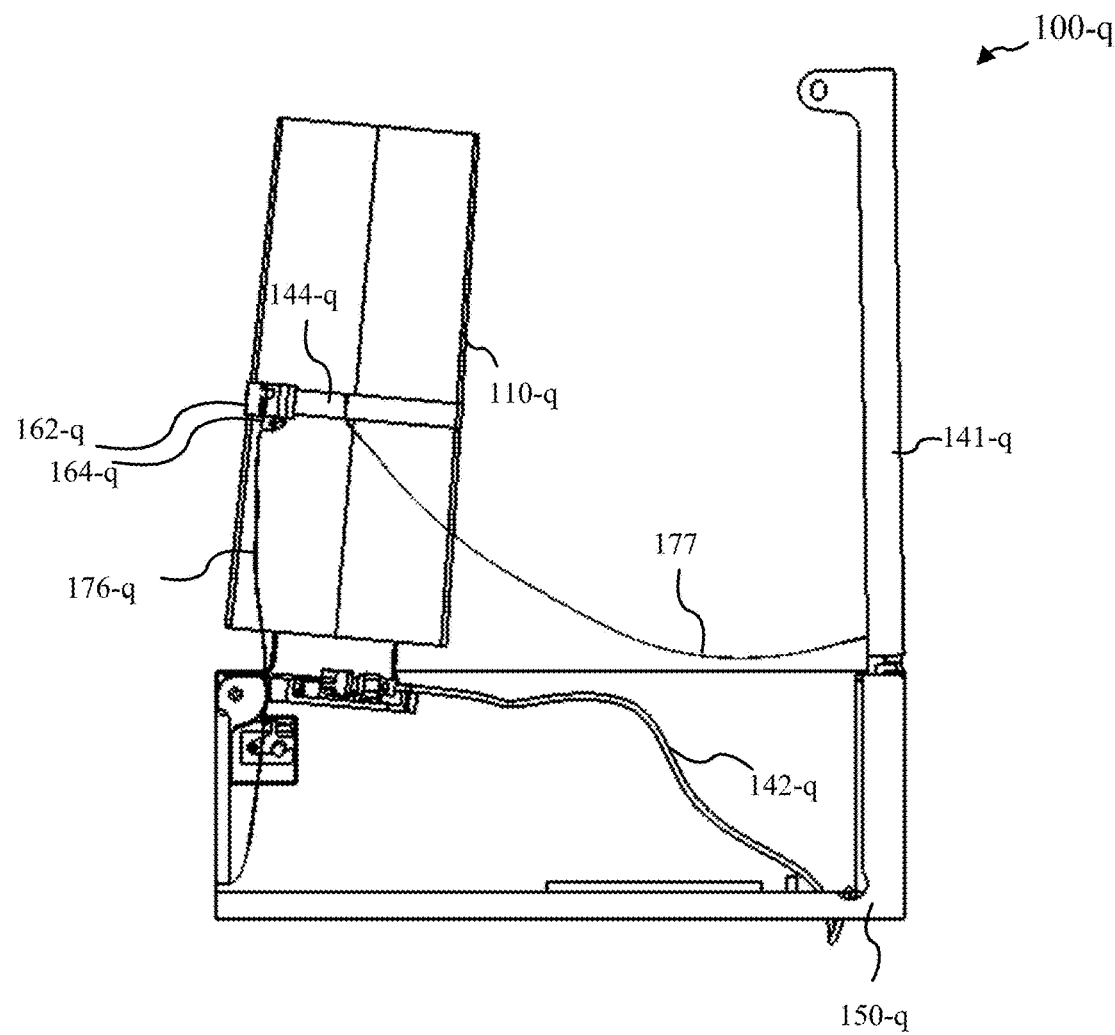
FIG. 11A shows a system in accordance with various embodiments.
Figure 11B:
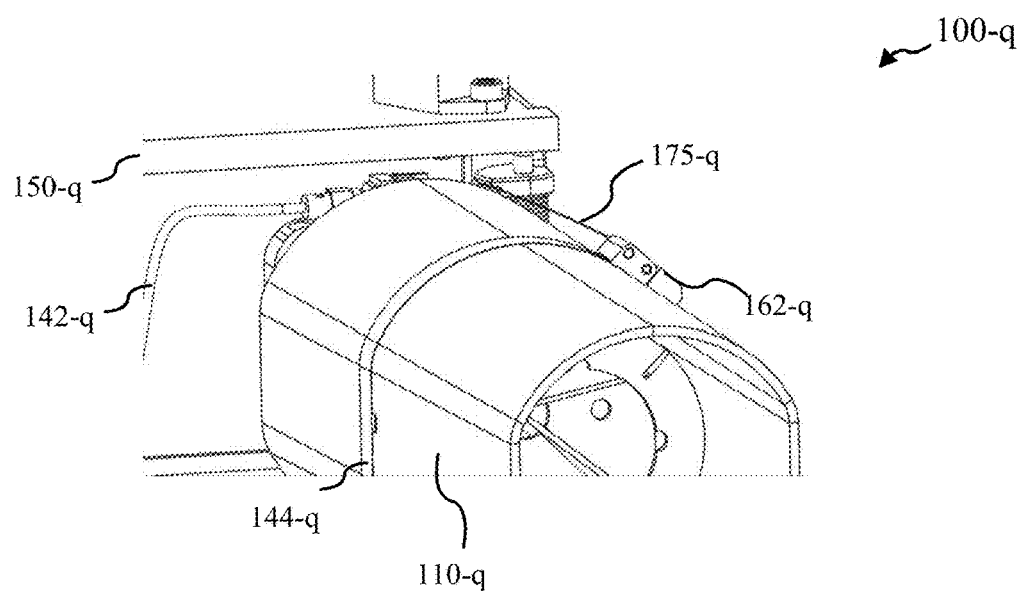
FIG. 11B shows a system in accordance with various embodiments.

FIG. 11A and FIG. 11B show a system 100-*q* during deployment in accordance with various embodiments. System 100-*q* may be an example of aspects of system 100 of FIG. 1A and/or system 100-*a* of FIG. 1B. For example, FIG. 11A may show a restraint lid 141-*q* that has opened, clearing the way for the one or more furlable antenna blade components 110-*q* to rotate out of the storage compartment 150-*q*. FIG. 11A may also show a tether 176-*q* that may be coupled with a release pin component 164-*q* of a restraint band release component 162-*q* such that the one or more furlable antenna blade components 110-*q* are unfurled at a specific point during deployment. Another tether 177 may be coupled with the restraint band 144-*q* so that the restraint band 144-*q* may be controlled from moving away from the system 100-*q* after deployment of the one or more furlable antenna blade components 110-*q*. System 100-*q* may also show cable 142-*q* (for power, grounding, and/or communications purposes) during a state of deployment where it has avoided twisting. FIG. 11B may show another perspective of the system 100-*q*.

Figure 12A:
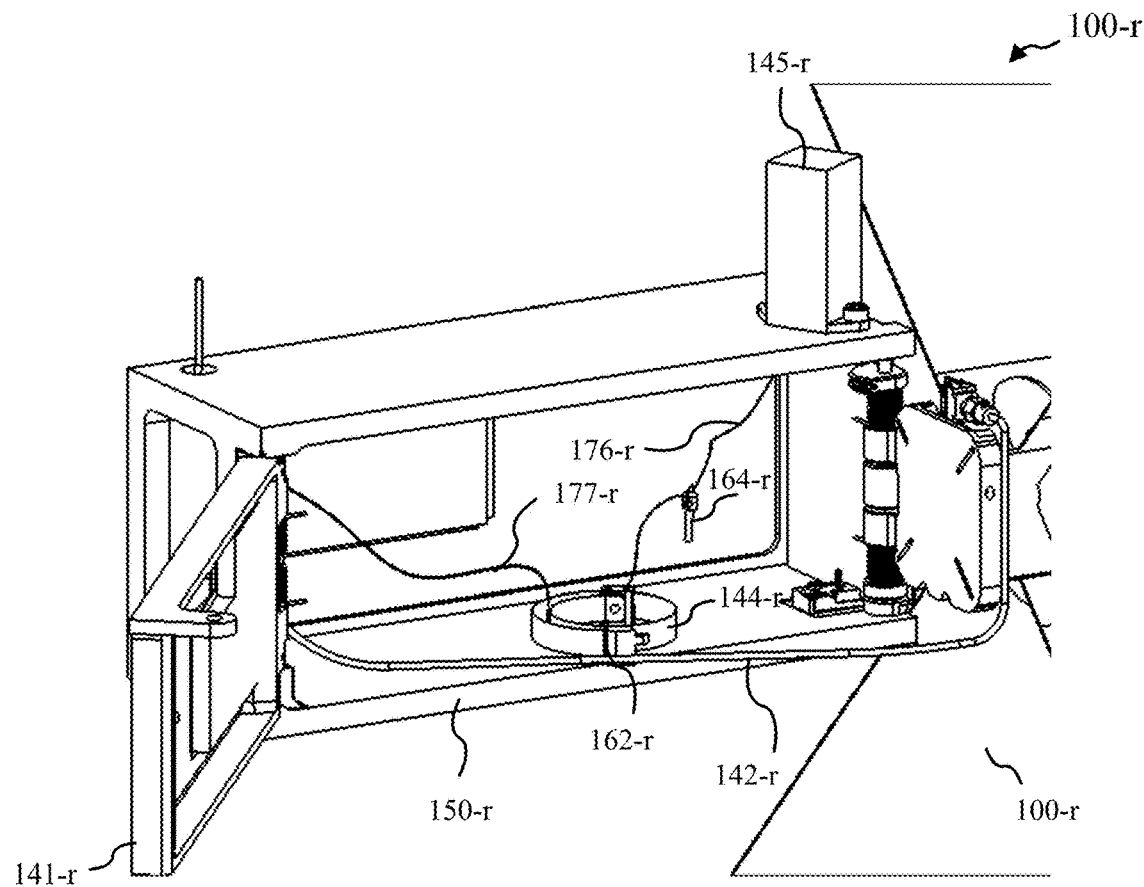
FIG. 12A shows a system in accordance with various embodiments.
Figure 12B:
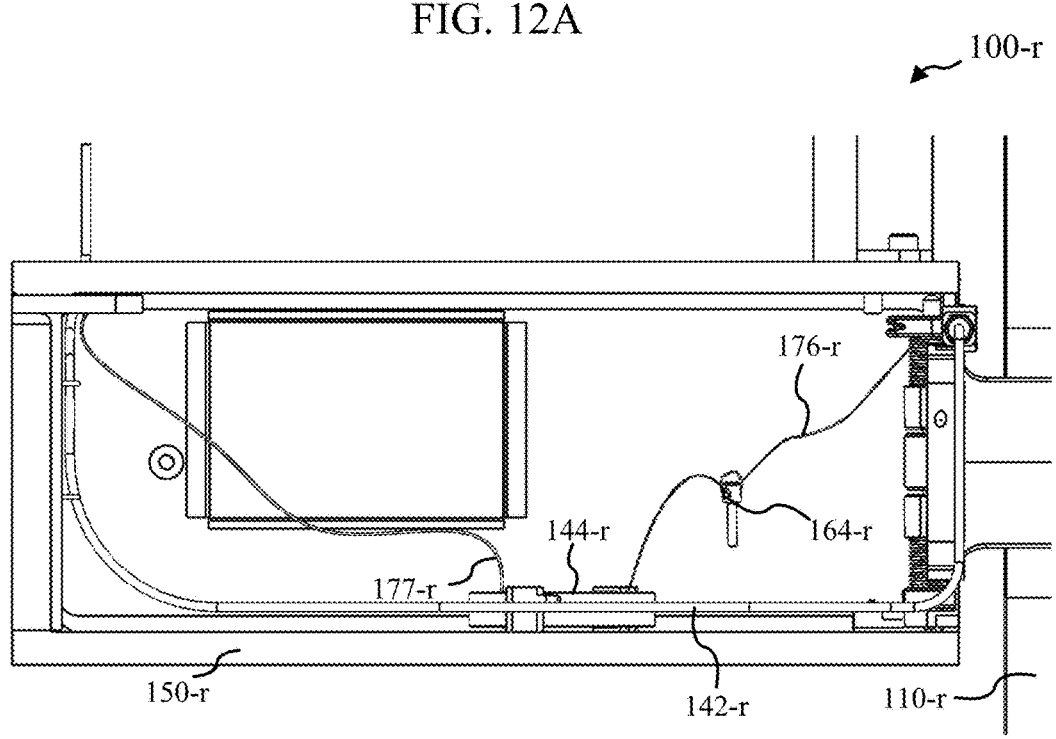
FIG. 12B shows a system in accordance with various embodiments.

FIG. 12A and FIG. 12B show a system 100-*r* in a deployed state in accordance with various embodiments. System 100-*r* may be an example of aspects of system 100 of FIG. 1A and/or system 100-*a* of FIG. 1B. For example, FIG. 12A may show a restraint lid 141-*r* that has opened, clearing the way for the one or more furlable antenna blade components 110-*r* to rotate out of the storage compartment 150-*r* and deploy. FIG. 12A may also show a tether 176-*r* that may be coupled with a release pin 164-*r* of a restraint band release component 162-*r* such that the one or more furlable antenna blade components 110-*r* have unfurled at a specific point during deployment; FIG. 12A and FIG. 12B both show the release pin 164-*r* that has been pulled from the restraint band release component 162-*r*, releasing the one or more furlable antenna blade components 110-*r*. Another tether 177-*r* may be coupled with the restraint band 144-*r* so that the restraint band 144-*r* may be controlled from moving away from the system 100-*r* after deployment of the one or more furlable antenna blade components 110-*r*. System 100-*r* may also show cable 142-*r* after deployment, where it has avoided twisting. FIG. 12B may show another perspective of the system 100-*r* after deployment.

Figure 13A:
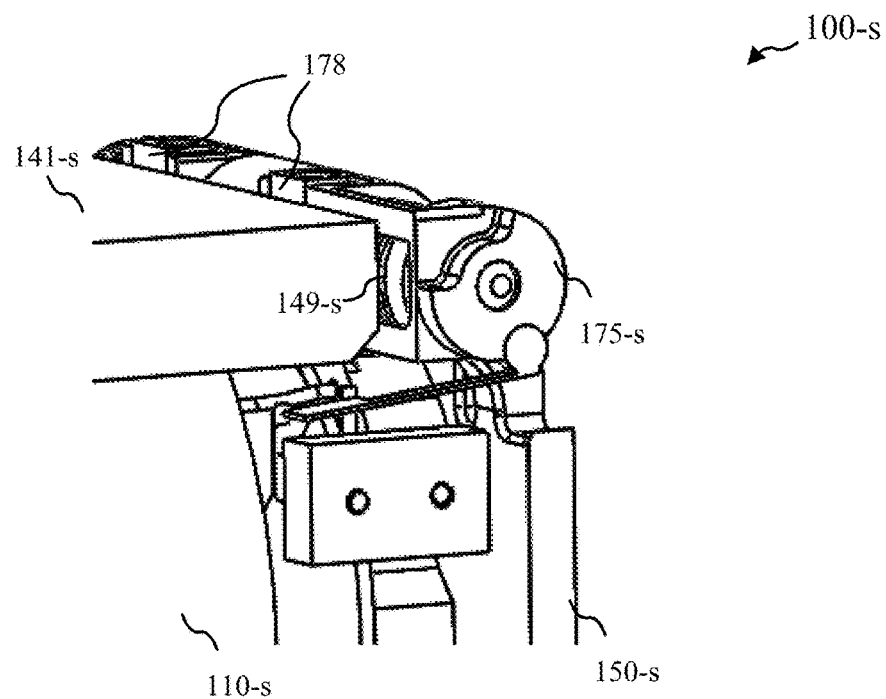
FIG. 13A shows a system in accordance with various embodiments.

FIG. 13A, FIG. 13B, FIG. 13C, and FIG. 13D show portions of a system 100-*s* during various stages of deployment in accordance with various embodiments. System 100-*s* may reflect one or more rotational hinge components 175-*s* for rotation deployment of one or more furled antenna blade components 110-*s* from a storage compartment 150-*s*. System 100-*s* may be an example of aspects of system 100 of FIG. 1A and/or system 100-*a* of FIG. 1B. FIG. 13A may show one or more stops 178 configured for controlling rotational deployment of the one or more furlable antenna blade components 110-*s* from the storage compartment 150-*s*; stops 178 may provide a dampening function. In some embodiments, the one or more stops 178 include at least a crushable energy absorber or an elastic element.

Figure 13B:
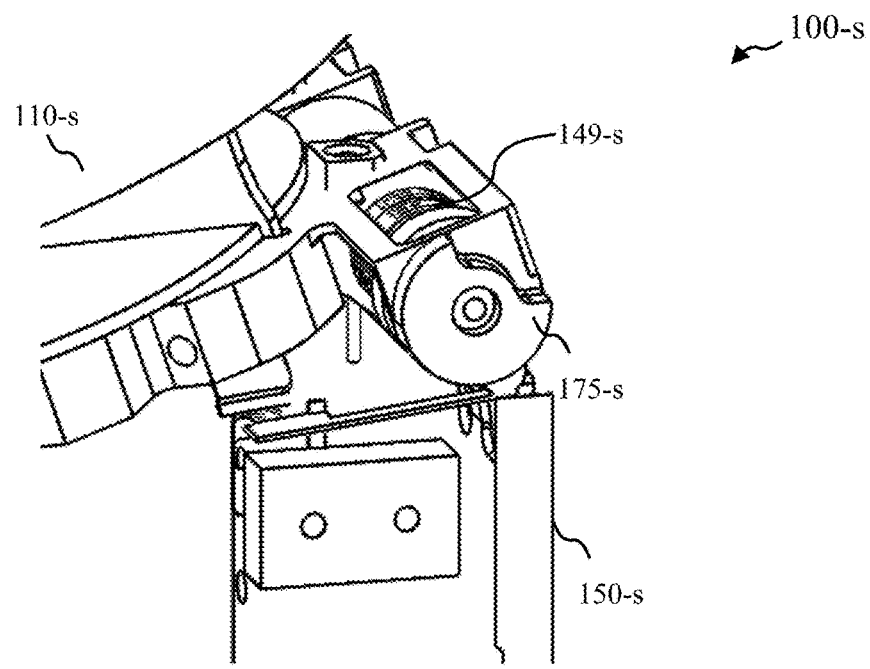
FIG. 13B shows a system in accordance with various embodiments.
Figure 13C:
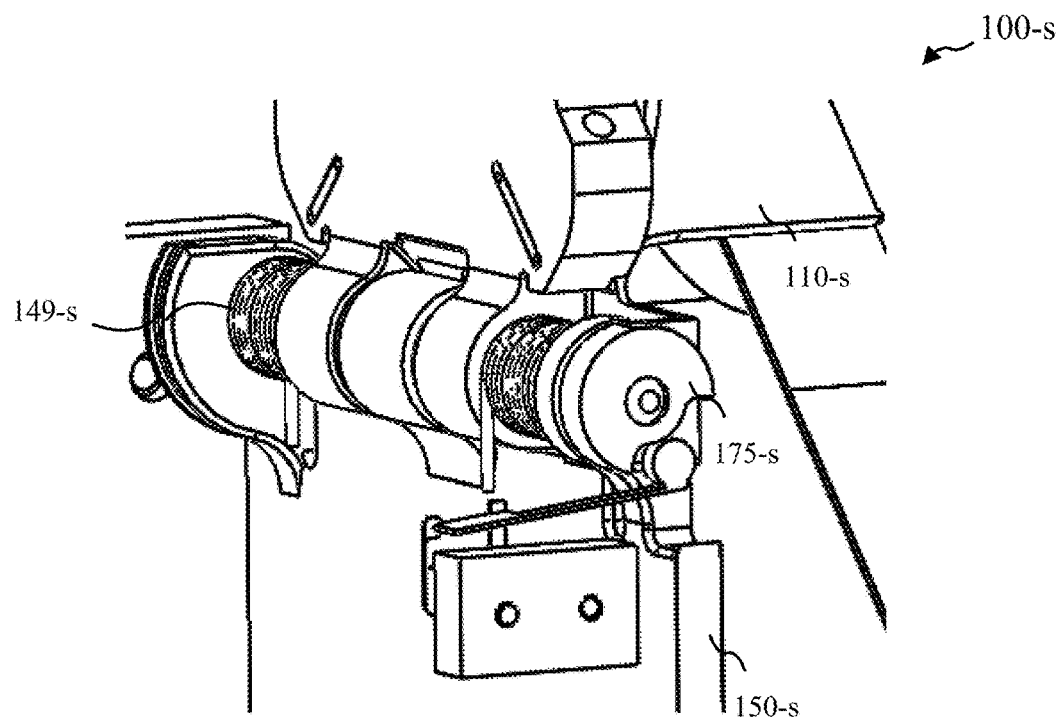
FIG. 13C shows a system in accordance with various embodiments.
Figure 13D:
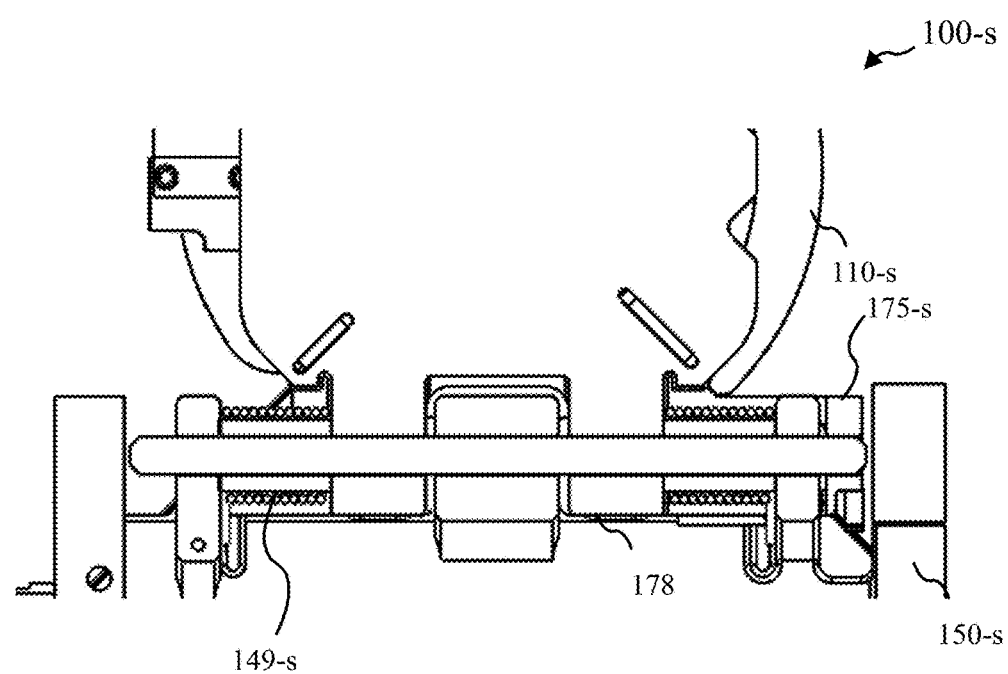
FIG. 13D shows a system in accordance with various embodiments.

Some embodiments include one or more torsion springs 149-s configured for the rotational deployment of the one or more furlable antenna blade components 110-s from the storage compartment 150-s. FIG. 13A may show the one or more furlable antenna blade components 110-s while they are still stowed within the storage compartment 150-s, with a restraint lid 141-s in a closed state. FIG. 13B may show system 100-s after the restraint lid 141-s has cleared to allow the one or more furlable antenna blade components 110-s to rotate out of the storage compartment 150-s. FIG. 13C and FIG. 13D may show system 100-s in a deployed state. In some embodiments, a switch, or break wire may be triggered when the furlable antenna blade components 110-s are near an end of deployment, which may confirm that a restraint band component has released and that the furlable antenna blade components 110-s may have rotated open.

Figure 14A:
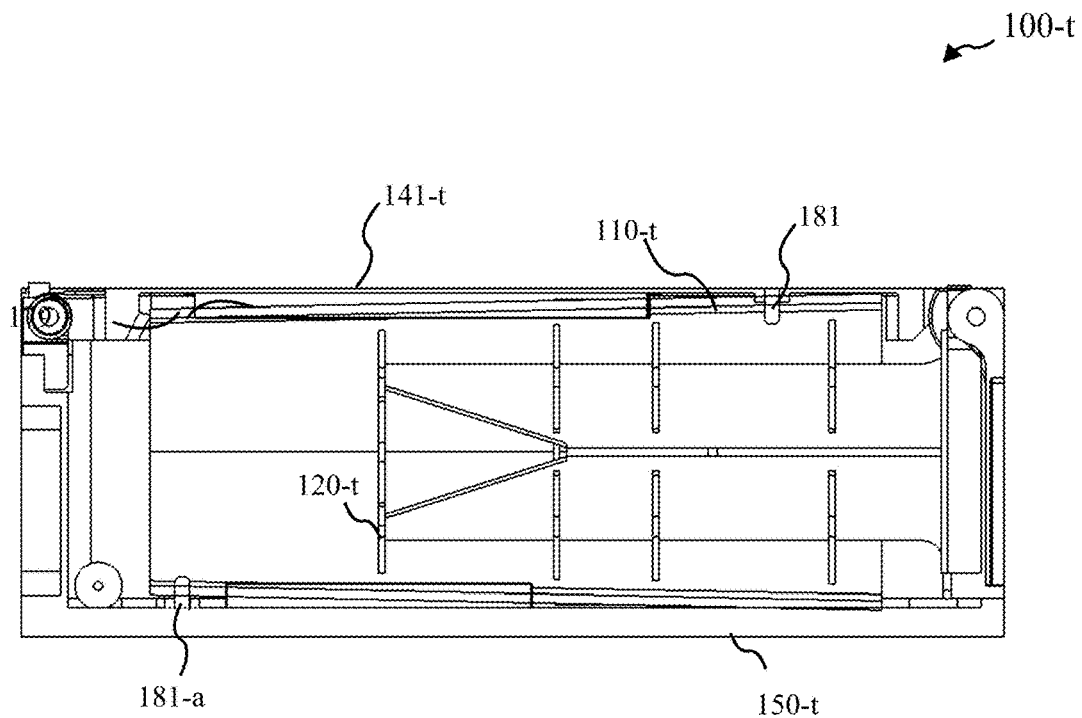
FIG. 14A shows a system in accordance with various embodiments.
Figure 14B:
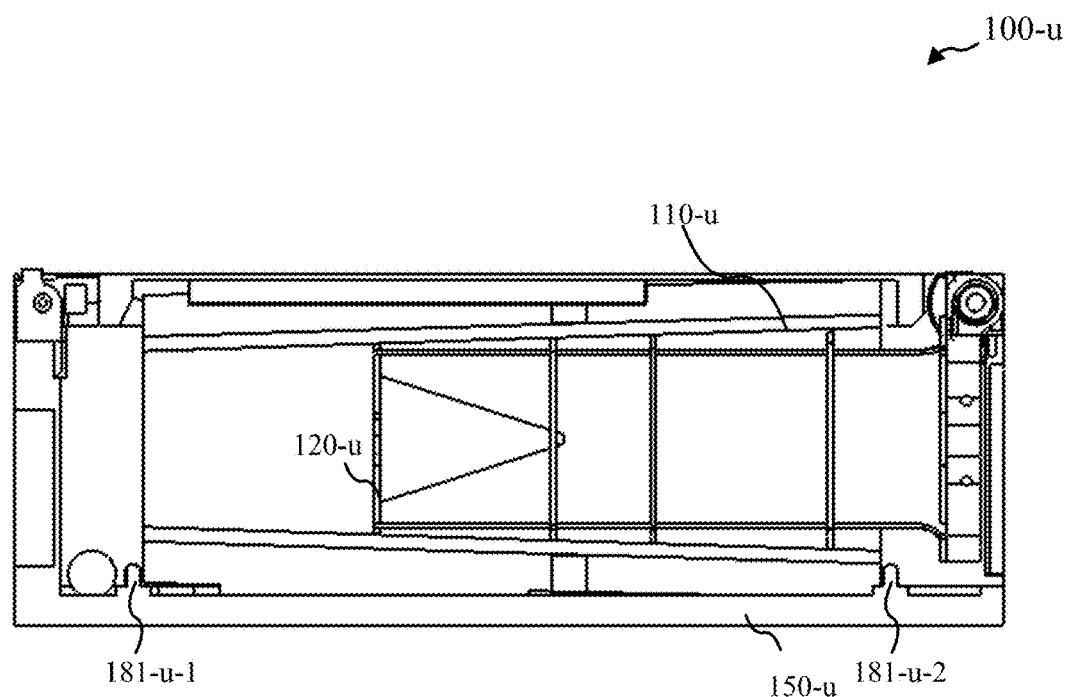
FIG. 14B shows a system in accordance with various embodiments.

FIG. 14A and FIG. 14B show cross sectional views of aspects of a systems 100-t and 100-u, respectively, and in accordance with various embodiments. System 100-t and 100-u may be an example of aspects of system 100 of FIG. 1A and/or system 100-a of FIG. 1B. One or more furlable antenna blades 110-t and 110-u may be furled and stowed within storage compartments 150-t and 150-u, respectively. One or more pins 181 may be configured to prevent motion of the one or more furlable antenna blade components 110-t and/or 110-u when the one or more furlable antenna blade components are furled and stowed in the storage compartment 150-t and/or 150-u. For example, in FIG. 14A, pins 181 may couple with restraint lid 141-b and may pass through one or more of the furlable antenna blade components 110-t in the stowed state; pin 181-a may be coupled with storage compartment 150-t and may pass through the one or more of the furlable antenna blade components 110-t. FIG. 14B may show an example where pins 181-u-1, 181-u-2 may provide hard stops for the one or more furlable antenna blade components 110-u when furled and stowed within the storage compartment 150-u. FIG. 14A and FIG. 14B may also show antenna blade support components 120-t, 120-u, respectively, which be configured to control a degree of bend of the one or more furlable antenna blade components 110-t and/or 110-u when furled and/or may include a conical shaped component configured such that the one or more antenna blade components 110-t and/or 110-u spiral around the conical shaped component when furled.

Figure 15A:
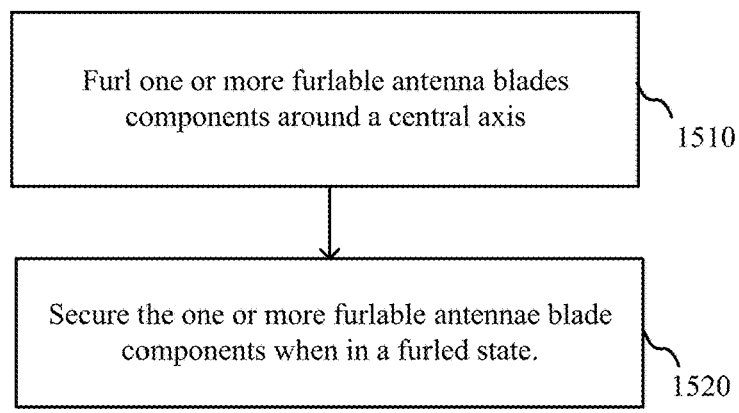
FIG. 15A shows a flow diagram of a method in accordance with various embodiments.

Turning now to FIG. 15A, a flow diagram of a method 1500 is shown in accordance with various embodiments. Method 1500 may be implemented utilizing a variety of systems and/or devices such as those shown and/or described with respect to FIG. 1A, FIG. 1B, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 6, FIG. 7A, FIG. 7B, FIG. 7C, FIG. 7D, FIG. 8A, FIG. 8B, FIG. 9, FIG. 10A, FIG. 10B, FIG. 10C, FIG. 10D, FIG. 11A, FIG. 11B, FIG. 12A, FIG. 12B, FIG. 13A, FIG. 13B, FIG. 13C, FIG. 13D, FIG. 14A, and/or FIG. 14B.

At block 1510, one or more furlable antenna blade components may be furled around a central axis. At block 1520, the one or more furlable antennae blade components may be secured when in a furled state.

Some embodiments of method 1500 include stowing the one or more furlable antenna blade components in the furled state within a storage compartment. In some embodiments, stowing the one or more furlable antenna blade components in the furled state within the storage compartment includes compressing the one or more furlable antenna blade components in the furled state.

Some embodiments of the method 1500 include releasing a restraint lid to initiate deployment of the one or more furlable antenna blade components in the furled state from the storage compartment. Some embodiments include rotating the one or more furlable antenna blade components in the furled state out from the storage compartment. Some embodiments include linearly sliding the one or more furlable antenna blade components in the furled state out from the storage component.

Some embodiments of the method 1500 include releasing the one or more furlable antenna blade components from the furled state into an unfurled state. In some embodiments, releasing the one or more furlable antenna blade components from the furled state into the unfurled state includes pulling a release pin, where the release pin is coupled with a restraint band utilized to secure the one or more furlable antenna blade components in the furled state and the release pin is coupled with at least a tether or rod coupled with the storage compartment. Some embodiments include utilizing at least a burn wire or a mechanical initiator to release the one or more furlable antenna blade components from the furled state into the unfurled state.

In some embodiments of the method 1500, furling the one or more furlable antenna blade components includes spiraling the one or more furlable antenna blade components around a conical shaped component through which the central axis passes. In some embodiments, the one or more furlable antenna blade components includes one or more conductive elements and one or more laminate layers. Some embodiments include one or more surface treatments with respect to at least the one or more conductive elements or the one or more laminate layers.

Some embodiments of the method 1500 include preventing motion of the one or more furlable antenna blade components in the furled state through utilizing one or more pins that may penetrate at least one of the one or more furlable antenna blade components in the furled state or provide a hard stop edge for the one or more furlable antenna blade components in the furled state.

Some embodiments of the method 1500 include utilizing one or more features coupled with at least one of the one or more furlable antenna blade components to avoid slippage of the restraint band during deployment of the one or more furlable antenna blade components from the furled state into the unfurled state. Some embodiments include providing at least lateral support or tensioned support for one or more furlable antenna blade components in the unfurled state.

Figure 15B:
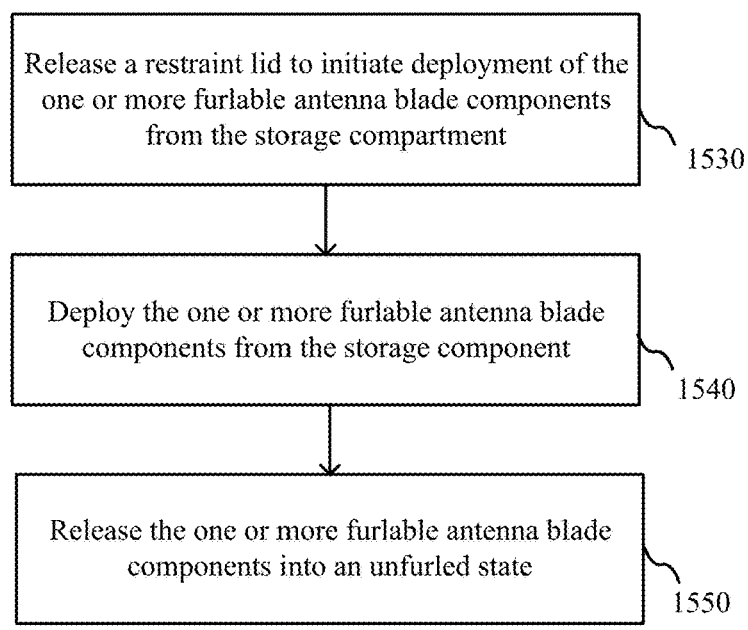
FIG. 15B shows a flow diagram of a method in accordance with various embodiments.

Turning now to FIG. 15B, a flow diagram of a method 1501 is shown in accordance with various embodiments. Method 1501 may be implemented utilizing a variety of systems and/or devices such as those shown and/or described with respect to FIG. 1A, FIG. 1B, FIG. 2A, FIG. 2B, FIG. 2C, FIG. 3A, FIG. 3B, FIG. 3C, FIG. 3D, FIG. 3E, FIG. 4A, FIG. 4B, FIG. 4C, FIG. 4D, FIG. 4E, FIG. 5A, FIG. 5B, FIG. 6, FIG. 7A, FIG. 7B, FIG. 7C, FIG. 7D, FIG. 8A, FIG. 8B, FIG. 9, FIG. 10A, FIG. 10B, FIG. 10C, FIG. 10D, FIG. 11A, FIG. 11B, FIG. 12A, FIG. 12B, FIG. 13A, FIG. 13B, FIG. 13C, FIG. 13D, FIG. 14A, and/or FIG. 14B. Method 1501 may be an example of aspects of method 1500 and/or may be utilized in conjunction with method 1500.

At block 1530, a restraint lid may be released to initiate deployment of the one or more furlable antenna blade components from the storage compartment. At block 1540, the one or more furlable antenna blade components may be deployed from the storage component. At block 1550, the one or more furlable antenna blade components may be released into an unfurled state.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A system comprising:
   a plurality of furlable antenna blade components, wherein each of the furlable antenna blade components from the plurality of furlable antenna blade components includes one or more conductive elements; and
   a rigid central hub coupled with each of the furlable antenna blade components from the plurality of furlable antenna blade components, wherein each of the furlable antenna blade components from the plurality of furlable antenna blade components furls around the rigid central hub in a stowed state and extends radially from the rigid central hub in a deployed state.

2. The system of claim 1, wherein each furlable antenna blade component from the plurality of furlable antenna blade components includes a plurality of laminate layers coupled with the one or more conductive elements, wherein each of the laminate layers from the plurality of laminate layers include a plurality of fibers that are at least coated or impregnated with an adherent.

3. The system of claim 1, further comprising one or more antenna blade support components configured to control a degree of bend of the one or more furlable antenna blade components when furled.

4. The system of claim 1, further comprising a restraint band component configured to hold the one or more furlable antenna blade components when furled.

5. The system of claim 4, further comprising one or more restraint band release components.

6. The system of claim 5, wherein the one or more restraint band release components include a release pin component configured to release the restraint band component.

7. The system of claim 6, further comprising at least a tether or a rod coupled with the release pin component such that the one or more furlable antenna blade components are unfurled at a specific point during deployment.

8. The system of claim 7, wherein at least one of the one or more furlable antenna blade components is configured such that the restraint band component avoids slippage during deployment of the one or more furlable antenna blade components.

9. The system of claim 1, further comprising one or more rotational hinges and one or more stops configured for rotational deployment of the one or more furlable antenna blade components from a storage compartment.

10. The system of claim 9, further comprising one or more torsion springs configured for the rotational deployment of the one or more furlable antenna blade components from a storage compartment.

11. The system of claim 1, further comprising a linear slide and stop configured for linear deployment of the one or more furlable antenna blade components from a storage compartment.

12. The system of claim 11, further comprising one or more linear springs configured for the linear deployment of the one or more furlable antenna blade components from the storage compartment.

13. The system of claim 1, wherein the one or more furlable antenna blade components are configured with curvature with respect to a central axis of each of the one or more furlable antenna blade components.

14. The system of claim 6, further comprising a storage compartment configured to hold the one or more furlable antenna blade components when furled.

15. The system of claim 14, further comprising a restraint lid coupled with the storage compartment.

16. The system of claim 2, wherein the one or more conductive elements include one or more conductive layers.

17. The system of claim 16, wherein at least a portion of one or more of the conductive layers extends beyond at least a portion of the one or more laminate layers.

18. The system of claim 2, wherein the one or more antenna blade support components include a conical shaped component configured such that the one or more furlable antenna blade components spiral around the conical shaped component when furled.

19. The system of claim 9, wherein the one or more stops include at least a crushable energy absorber or an elastic element.

20. The system of claim 14, further comprising one or more pins configured to prevent motion of the one or more furlable antenna blade components when the one or more furlable antenna blade components are furled and stowed in the storage compartment.

21. The system of claim 1, further comprising one or more stabilizers configured to slide relative the one or more conductive elements of the one or more furlable antenna blade components when furled.

22. The system of claim 15, wherein at least the storage compartment or the restraint lid includes one or more encapsulated foam layers.

23. The system of claim 15, wherein the restraint lid includes at least one aperture configured to hold the restraint band release component in place when the one or more furlable antenna blade components are furled and stowed within the storage compartment.

24. The system of claim 1, further comprising one or more cables coupled with the one or more furlable antenna blade components and configured to provide at least a power link, a ground link, or communication link for the one or more furlable antenna blade components and to avoid twisting during deployment of the one or more furlable antenna blade components.

25. The system of claim 2, wherein at least a portion of the one or more conductive elements of each of the furlable antenna blade components from the plurality of furlable blade components is sandwiched between at least a portion of a first laminate layer from the plurality of laminates layers and a portion of a second laminate layer from the plurality of laminate layers.

* * * * *